US 6,668,161 B2

(12) United States Patent
Boros et al.

(10) Patent No.: US 6,668,161 B2
(45) Date of Patent: Dec. 23, 2003

(54) DETERMINING A SPATIAL SIGNATURE USING A ROBUST CALIBRATION SIGNAL

(75) Inventors: Tibor Boros, Sunnyvale, CA (US); Craig H. Barratt, Redwood City, CA (US); Christopher R. Uhlik, Danville, CA (US); Mitchell D. Trott, Mountain View, CA (US)

(73) Assignee: ArrayComm, Inc., San Jose, CA (US)

( * ) Notice: Subject to any disclaimer, the term of this patent is extended or adjusted under 35 U.S.C. 154(b) by 0 days.

(21) Appl. No.: 10/135,979

(22) Filed: Apr. 29, 2002

(65) Prior Publication Data

US 2002/0155818 A1 Oct. 24, 2002

Related U.S. Application Data

(62) Division of application No. 09/295,434, filed on Apr. 20, 1999.
(60) Provisional application No. 60/083,875, filed on May 1, 1998.

(51) Int. Cl.$^7$ .................................................. H04B 17/00
(52) U.S. Cl. ................................ 455/67.14; 455/67.11; 455/562; 370/310; 370/328
(58) Field of Search ........................... 455/67.11, 67.14, 455/562; 370/310, 328; 342/174, 378

(56) References Cited

U.S. PATENT DOCUMENTS

| | | |
|---|---|---|
| 3,704,465 A | 11/1972 | Masak et al. |
| 3,774,209 A | 11/1973 | Fleming et al. |
| 3,798,645 A | 3/1974 | Baurle et al. |
| 3,852,749 A | 12/1974 | Kohler |
| 3,946,385 A | 3/1976 | Ewen |

(List continued on next page.)

FOREIGN PATENT DOCUMENTS

| | | | |
|---|---|---|---|
| EP | 0 665 665 A1 | 1/1995 | |
| EP | 0 639 035 A1 | 2/1995 | |
| EP | 0713261 A1 | 5/1996 | .......... H01Q/3/026 |
| EP | 0 777 400 A2 | 6/1997 | |
| EP | 0786914 A2 | 7/1997 | .......... H04Q/7/022 |

(List continued on next page.)

OTHER PUBLICATIONS

Papadias et al., "A Space–Time Constant Modulus Algorithm for SDMA Systems", 1996, Proceedings, IEEE 46th Vehicular Technology Conference, pp. 86–90.

(List continued on next page.)

*Primary Examiner*—Charles Appiah
*Assistant Examiner*—James K Moore
(74) *Attorney, Agent, or Firm*—Blakely, Sokoloff, Taylor & Zafman LLP

(57) ABSTRACT

A partial spatial signature can be determined to be used in calibration. In one embodiment, determining the partial spatial signature includes receiving a first segment of a waveform, the first segment resulting from a radio transmitting a combined signal from a first antenna element, the combined signal comprising the sum of a first signal and a second signal, and calculating a first spatial signature related measurement using the received first segment, the first signal and the second signal. The process may further include receiving a second segment of the waveform, the second segment resulting from the radio transmitting the first signal from the first antenna element, and the radio simultaneously transmitting the second signal from a second antenna element, and calculating a second spatial signature related measurement using the second received segment, the first signal and the second signal. Then, determining the partial spatial signature may be done using the first spatial signature related measurement and the second spatial signature related measurement.

35 Claims, 11 Drawing Sheets

U.S. PATENT DOCUMENTS

| | | |
|---|---|---|
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |
| 4,263,568 A | 4/1981 | Nemit |
| 4,316,191 A | 2/1982 | Sawatari et al. |
| 4,375,622 A | 3/1983 | Hollingsworth et al. |
| 4,434,505 A | 2/1984 | Gutleber |
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. ............. 364/460 |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,274,844 A | 12/1993 | Harrison et al. .............. 455/25 |
| 5,276,907 A | 1/1994 | Meidan ..................... 455/33.3 |
| 5,283,540 A | 2/1994 | Myer |
| 5,299,148 A | 3/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,515,378 A | 5/1996 | Roy, III et al. |
| 5,530,449 A | 6/1996 | Wachs et al. ............... 342/174 |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. ............. 342/174 |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A | 10/1996 | Dean |
| 5,566,209 A | 10/1996 | Forssen et al. |
| 5,576,717 A | 11/1996 | Searle et al. |
| 5,592,490 A | 1/1997 | Barratt et al. ................ 370/310 |
| 5,596,625 A | 1/1997 | LeBlanc |
| 5,603,082 A | 2/1997 | Hamabe |
| 5,603,089 A | 2/1997 | Searle et al. |
| 5,606,729 A | 2/1997 | D'Amico et al. |
| 5,615,409 A | 3/1997 | Forssen et al. |
| 5,621,752 A | 4/1997 | Antonio et al. |
| 5,625,880 A | 4/1997 | Goldburg |
| 5,625,885 A | 4/1997 | Nakazawa et al. |
| 5,638,375 A | 6/1997 | Dettro et al. |
| 5,642,353 A | 6/1997 | Roy, III et al. |
| 5,649,287 A | 7/1997 | Forssen et al. |
| 5,673,291 A | 9/1997 | Dent |
| 5,675,581 A | 10/1997 | Soliman |
| 5,678,188 A | 10/1997 | Hisamura |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,726,978 A | 3/1998 | Frodigh et al. |
| 5,732,076 A | 3/1998 | Ketseoglou et al. |
| 5,742,904 A | 4/1998 | Pinder et al. |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,809,009 A | 9/1998 | Matsuoka et al. |
| 5,809,019 A | 9/1998 | Ichihara et al. |
| 5,812,090 A | 9/1998 | Chevalier et al. |
| 5,818,918 A | 10/1998 | Fujii |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,867,123 A | 2/1999 | Geyh et al. |
| 5,884,148 A | 3/1999 | Bilgic et al. |
| 5,887,038 A | 3/1999 | Golden |
| 5,905,721 A | 5/1999 | Liu et al. .................... 455/562 |
| 5,909,470 A | 6/1999 | Barratt et al. ................ 375/324 |
| 5,914,946 A | 6/1999 | Avidor et al. |
| 5,930,243 A | 7/1999 | Parish et al. ................. 370/334 |
| 6,023,203 A | 2/2000 | Parish |
| 6,037,898 A | 3/2000 | Parish et al. ................. 342/174 |
| 6,122,260 A | 9/2000 | Liu et al. |
| 6,134,261 A * | 10/2000 | Ryan .......................... 375/141 |
| 6,154,661 A | 11/2000 | Goldburg .................... 455/562 |
| 6,192,256 B1 | 2/2001 | Whinnett |

FOREIGN PATENT DOCUMENTS

| | | | |
|---|---|---|---|
| GB | 2 237 706 A | 5/1991 | |
| GB | 2 295 524 A | 5/1996 | |
| GB | 2 313 261 A | 11/1997 | |
| JP | 7-170548 | 4/1995 | |
| WO | WO95/34103 | 12/1995 | .......... H01Q/3/026 |
| WO | 98/01963 | 1/1998 | |
| WO | WO98/17037 | 4/1998 | .......... H04L/27/22 |
| WO | 98/17071 | 4/1998 | |
| WO | 98/28864 | 7/1998 | |
| WO | 98/33346 | 7/1998 | |

OTHER PUBLICATIONS

Rashid–Farrokhi et al., "Downlink and Uplink Capacity Enhancement in Power Controlled Cellular Systems", Proceedings, 1997 IEEE 47th Vehicular Technology Conference, vol. 2, 5/97.

Rashid–Farrokhi et al., "Downlink Power Control and Base Station Assignment", IEEE Communications Letters, vol. 1, No. 4, 07/97, pp. 102–104.

Rashid–Farrokhi et al., "Joint Power Control and Beamforming for Capacity Improvement in Wireless Networks with Antenna Array", 1996, IEEE GLOBECOM 1996, vol. 1, pp. 555–559.

Rashid–Farrokhi et al., "Transmit Beamforming for Cellular Communication Systems", Conference on Information Sciences and Systems, CISS–97; Mar. 1997, 4 pps.

Rashid–Farrokhi et al., "Transmit Diversity and Equalization for Power Controlled Wireless Networks", Conference Record 31st Asilomar Conference on Signals, Systems, and Computers, vol. 1, 11/97, pp. 620–624.

Swidlehurst et al., "Analysis of a Decision Directed Beamformer", IEEE Transactions on Signal Processing, vol. 43, No. 12, 12/95, pp. 2920–2927.

Xu et al., "Throughput Multiplication of Wireless LANs for Multimedia Services: SDMA Protocol Design", 1994, IEEE, pp. 1326–1332.

PCT Search Report, PCT/US99/08856, Feb. 8, 1999, 5 pps.

PCT Search Report, US98/25364, May 11, 1999.

Zhang et al., "Performance of a Modified Polling Strategy for Broadband Wireless LANs in a Harsh Fading Environment", 1991, GLOBECOM 1991, pp. 1141–1146.

Cellular Systems, Proceedings, 1997 IEEE 47th Vehicular Technology Conference, vol. 2, 5/97, pp. 647–651.

Rashid–Farrokhi et al., "Joint Power Control and Beamforming for Capacity Improvement in Wireless Networks with Antenna Array", 1996, IEEE GLOBECOM 1996, vol. 1, pp.

Talwar et al., "Blind Estimation of Multiple Co–Channel digital Signals Arrivng at an Antenna Array", 1993, Proc. 27th Asilomar Conference on Signals, Systems, and.

Franks, "Syncrhonization Subsystems: Analysis and Design", 1981, Digital Communications Satellite/Earth Station Engineering, pp. 294–335.

Ganz et al., "a Data–Derived Reference Signal Technique for Adaptive Arrays", IEEE Transactions on Communications, vol. 37, No. 9, Sep. 1989, pp. 975–983.

Iltis et al., "A Digital DS Spread–Spectrum Receiver with Joint Channel and Doppler Shift Estimation", IEEE Transactions on Coummunications, vol. 39, No. 8, Aug. 1991, pp. 1255–1267.

Krishnamurthy et al., "Polling Based Media Access Protocols for Use with Smart Adaptive Array Antennas" 1998 IEEE, pp. 337–344.

Lee et al., "Decision Directed Carrier Recovery—Chapter 16: Carrier Recovery", 1994 Digital Communications, 2nd Edition, Kluwer Academic Pub., pp. 725–736.

Lee et al., "Decision Directed Carrier Recovery—Chapter 17: Timing Recovery", 1994 Digital Communications, 2nd Edition, Kluwer Academic Pub., pp. 737–764.

Lundell et al., "Applications of the Constant Modulus Adaptive Beamformer to Constant an Non Constant Modulus Signals", Proceedings, 1998 Asilomar Conference on Signals, Systems, and Computers (ACSSC–1988), pp. 432–436.

Dept. of Electrical Engineering, Mobile and Portable Radio Research Group, Section 3.8, pp. 64–71.

Received at an Antenna Array, Proc. Fifth Annual IEEE Dual Use Technologies and Applications Conference.

Applications in Mobile Communications, SPIE 1994 "Advanced Signal Processing Algorithms, Architectures, and Implementations V", vol. 2296, pp. 230–241.

Acampora et al., "A New Adaptive MAC Layer Protocol for Wireless ATM Networks in Harsh Fading and Interference Environments", 1997 IEEE, pp. 410–415.

Agee, "Blind Separation and Capture of Communication Signals Using a Multitarget Constant Modulus Beamformer", Oct. 7, 1989 Proc. IEEE Military Communications Conference, vol. 2, pp. 1–12.

Aschied et al., "An All Digital Receiver Architecture for Bandwidth Efficient Transmission at High Data Rates", 1989, IEEE Transactions on Communications, vol. 37, No. 8, pp. 804–813.

Friedlander et al., "Direction Finding for Wideband Signals Using an Interpolated Array", 1991, IEEE Publication, pp. 583–587.

Friedlander, "Direction Finding Using an Interpolated Array", Apr. 3, 1990, International Conference on Acoustics, Speech, and Signal Processing, vol. 5, pp. 2951–2954.

* cited by examiner

DETERMINING A SPATIAL SIGNATURE USING A ROBUST CALIBRATION SIGNAL

CROSS REFERENCE TO RELATED APPLICATIONS

This divisional application claims the benefit of U.S. Provisional Patent Application Serial No. 60/083,875 for Method and Apparatus for Determining Spatial Signatures with Application to Calibrating a Base Station Having an Antenna Array, to inventors Boros, Barratt, Uhlik and Trott, Assignee ArrayComm, Inc., filed May 1, 1998 and the benefit as a division of U.S. patent application Ser. No. 09/295,434, for Method and Apparatus for Determining Signatures for Calibrating a Communication Station Having an Antenna Array, to inventors Boros, Barratt, Uhlik and Trott, Assignee ArrayComm, Inc., filed Apr. 20, 1999.

FIELD OF INVENTION

This invention relates to the field of wireless communication systems, and more specifically, to a method and apparatus for calibrating a communication station that includes an array of antenna elements.

BACKGROUND

Smart Antenna Systems

Antenna arrays may be used in any wireless communication receiver or transmitter or transceiver (herein under "communication station") that transmits or receives radio frequency signals using an antenna or antennas. The use of antenna arrays in such a communication station provides for antenna performance improvements over the use of a single element antenna. These antenna performance improvements include improved directionality, signal to noise ratio, and interference rejection for received signals, and improved directionality, security, and reduced transmit power requirements for transmitted signals. Antenna arrays may be used for signal reception only, for signal transmission only, or for both signal reception and transmission.

A typical application of antenna array communication stations is in a wireless communication system. Examples include a cellular communication system consisting of one or more communication stations, generally called base stations, each communicating with its subscriber units, also called remote terminals and handsets. In cellular systems, the remote terminal may be mobile or in a fixed location, and when fixed, such a system often is called a wireless local loop system. The antenna array typically is at the base station. Terminology for the direction of communication comes from conventional satellite communication, with the satellite replaced by the base station. Thus, communication from the remote terminal to the base station is called the uplink, and communication from the base station to the remote terminal is called the downlink. Thus, the base station antenna array transmits on the downlink direction and receives on the uplink direction. Antenna arrays also may be used in wireless communication systems to add spatial division multiple access (SDMA) capability, which is the ability to communicate with several users at a time over the same "conventional" (FDMA, TDMA or CDMA) channel. We have previously disclosed adaptive smart antenna processing (including spatial processing) with antenna arrays to increase the spectrum efficiency of SDMA and non-SDMA systems. See Co-owned U.S. Pat. No. 5,515,378 for SPATIAL DIVISION MULTIPLE ACCESS WIRELESS COMMUNICATION SYSTEM, U.S. Pat. No. 5,592,490 for SPECTRALLY EFFICIENT HIGH CAPACITY WIRELESS COMMUNICATION SYSTEMS, U.S. Pat. No. 5,828,658 for SPECTRALLY EFFICIENT HIGH CAPACITY WIRELESS COMMUNICATION SYSTEMS WITH SPATIO-TEMPORAL PROCESSING, and U.S. patent application Ser. No. 08/729,390 for METHOD AND APPARATUS FOR DECISION DIRECTED DEMODULATION USING ANTENNA ARRAYS AND SPATIAL PROCESSING. Systems that use antenna arrays to improve the efficiency of communications and/or to provide SDMA sometimes are called smart antenna systems.

With smart antenna communication systems that use linear spatial processing for the adaptive smart antenna processing, during uplink communications, one applies amplitude and phase adjustments in baseband to each of the signals received at the antenna array elements to select (i.e., preferentially receive) the signals of interest while minimizing any signals or noise not of interest—that is, the interference. Such baseband amplitude and phase adjustment can be described by a complex valued weight, the receive weight, and the receive weights for all elements of the array can be described by a complex valued vector, the receive weight vector. Similarly, the downlink signal is processed by adjusting the amplitude and phase of the baseband signals that are transmitted by each of the antennas of the antenna array. Such amplitude and phase control can be described by a complex valued weight, the transmit weight, and the weights for all elements of the array by a complex valued vector, the transmit weight vector. In some systems, the receive (and/or transmit) weights include temporal processing, and then are called spatio-temporal parameters for spatio-temporal processing. In such cases, the receive (and/or transmit) weights may be functions of frequency and applied in the frequency domain or, equivalently, functions of time applied as convolution kernels. Alternatively, each convolution kernel, if for sampled signals, may itself be described by a set of complex numbers, so that the vector of convolution kernels may be re-written as a complex values weight vector, which, for the case of there being M antennas and each kernel having K entries, would be a vector of KM entries.

The receive spatial signature characterizes how the base station array receives signals from a particular subscriber unit in the absence of any interference or other subscriber units. A receive weight vector for a particular user may be determined using different techniques. For example, it may be determined from spatial signatures. It also may be determined from the uplink signals received at the antennas of the array from that remote user using some knowledge about these uplink signals, for example, the type of modulation used. The transmit spatial signature of a particular user characterizes how the remote user receives signals from the base station in the absence of any interference. The transmit weight vector used to communicate on the downlink with a particular user is determined either from the receive weight vector (see below under "The Need for Calibration") or from the transmit spatial signature of the particular user and the transmit spatial signatures of the other users in such a way as to maximize the energy to the particular user and minimize the energy to the other users.

U.S. Pat. No. 5,592,490 for SPECTRALLY EFFICIENT HIGH CAPACITY WIRELESS COMMUNICATION SYSTEMS describes spatial signatures and their uses, and U.S. Pat. No. 5,828,658 for SPECTRALLY EFFICIENT HIGH CAPACITY WIRELESS COMMUNICATION SYSTEMS WITH SPATIO-TEMPORAL PROCESSING, incorporated herein by reference, describes how to extend this to spatio-temporal processing using spatio-temporal signatures.

Thus, while the description herein is provided in terms of spatial signatures, adding time equalization to provide spatio-temporal processing is easily accommodated, for example by adding the concepts of spatio-temporal signatures, which may be described by MK vectors (both uplink and downlink) when the temporal processing is using equalizers with K taps (i.e., convolution kernels of length K in the weight convolving functions). Thus, how to modify the invention to accommodate spatio-temporal processing and spatio-temporal signatures would be clear to those of ordinary skill in the art, for example in view of above-referenced and incorporated herein by reference U.S. Pat. No. 5,828,658. Therefore, those in the art would understand that any time the term spatial signature is used, this might indeed be referring to a spatio-temporal signature in the context that the invention is being applied to a communication station equipped with means for spatio-temporal processing.

The Need for Calibration

It is desirable to determine the transmit weight vector from the receive weight vector for a particular user. More generally, it is desirable to determine the appropriate transmit signals to use for transmitting to a particular user from signals received from that user. Practical problems may make difficult determining the transmit weight vector from the receive weight vector for a particular user. Frequency division duplex (FDD) systems are those in which uplink and downlink communications with a particular remote user occur at the different frequencies. Time division duplex (TDD) systems are those in which uplink and downlink communications with a particular remote user occur at the same frequency but in different time slots. In a TDD system, because of the well known principle of reciprocity, it might be expected that determining the transmit weight vector from the receive weight vector is straightforward. However, on the uplink, the received signals that are being processed may be somewhat distorted by the receive electronics (the receive apparatus chains) associated with each of the antenna elements of the antenna array. The receive electronics chain includes the antenna element, cables, filters, RF receivers and other components, physical connections, and analog-to-digital converter ("ADC") if processing is digital. In the case of a multi-element antenna array, there typically is a separate receive electronics apparatus chain for each antenna array element, and thus the amplitude and the phase of each of the received signals at each element may be distorted differently by each of the receive apparatus chains. In addition, there are RF propagation effects that take place on the uplink between the subscriber unit and a particular receiving antenna, such effects including without limitation the path loss, fading and shading effects, multipath, and near-field scattering, and these effects may be different from antenna element to antenna element. Note that the receive electronics chain and the RF propagation effects together make up the uplink spatial signature for the remote user. A receive weight vector that does not take these receive electronics chain and RF propagation effects into account will be in error, causing less than optimal reception at the base station. However, in practice, communication may still be possible. Also, when a receive weight vector is determined using some knowledge of the characteristics of the received signal, for example, the type of modulation used, such a method already takes into account the uplink receive electronics chain and RF propagation effects. When one transmits downlink signals through the antenna array, each of the signals radiated by an antenna element goes through a different transmit electronics apparatus chain, thus possibly causing different amplitude and phase shifts in the transmitted signals. In addition, there are again RF propagation effects. If the transmit weight vector was derived from a receive weight vector that did not take the differences in the receive electronics chains and RF propagation into account, transmission from the base station may be hard to achieve. Further difficulty may result if the transmit weight vector does not take differences in the transmit electronics chains and transmit RF propagation effects into account, possibly making communication using such a transmit weight vector impossible.

The purpose of calibration is to determine calibration factors for compensating for the different amplitude and phase errors that occur in the signals in the receive chain and uplink RF propagation, and the different amplitude and phase errors that occur in the transmit chain and downlink RF propagation, the calibration factors used in a communication station to determine a transmit weight vector for transmitting to a remote user from the set of signals received from the remote user. It should be added that because the phase and amplitude shifts that occur in the receive and transmit apparatus chains are, in general, frequency dependent, so in general are the calibration factors frequency dependent.

In the case of a TDD system, the uplink and downlink RP propagation effects cancel so that the calibration factors are independent of the location of the subscriber unit.

It is known that compensation can be achieved by convolving each of the M signals received or transmitted by the antenna elements by a calibration function (i.e., by a complex valued time sequence), where each calibration function describes the transfer function correction required to compensate for the gain and phase errors a signal undergoes when passing through the transmit and receive apparatus chains. In some systems, this can be simplified to multiplicative correction, where each calibration function is a calibration factor—a complex valued number that describes the required amplitude and phase correction required for compensation. In general, the set of calibration functions defines a calibration vector function with each element a calibration function. In the case of multiplicative correction, the set of calibration factors defines a calibration vector with each element a calibration factor.

Determining the transmit weight vectors from the receive weight vectors for a particular user is more difficult in the case of an FDD system because reciprocity may no longer be assumed. One needs to additionally take into account the differences in propagation on the uplink and downlink. Once one does take such differences into account, there still is a need to determine calibration factors for compensating for the different amplitude and phase errors that occur in the signals in the receive chain and uplink RF propagation and the different amplitude and phase errors that occur in the transmit chain and downlink RF propagation. In general, single calibration factors that are independent of the location of the remote user may not be possible. In such a case, one needs to be able to determine the uplink and downlink spatial signatures.

In the case of no calibration factors that are independent of the remote user location being possible, when there is some functional relationship that enables one to determine the transmit weight vector to use from the received signals and some parameter, for example, the angle of arrival, there still is a need to determine a set of calibration functions for compensating for the different amplitude and phase errors that occur in the signals in the receive chain and uplink RP propagation and the different amplitude and phase errors that occur in the transmit chain and downlink RF propagation, these functions being dependent on one or more parameters of the remote user, for example the angle of arrival.

The Need for Signature Estimation

When no simple calibration (as defined above) is possible, one still needs to compensate for the different amplitude and phase errors that occur in the signals in the receive chain and uplink RF propagation, and the different amplitude and phase errors that occur in the transmit chain and downlink RP propagation. The purpose of signature estimation is to determine the uplink and downlink spatial signatures which characterize these differences. Thus calibration is a special case of signature estimation when either 1) the RF propagation effects cancel so that downlink weights can be determined from uplink signals or weights, or 2) there is some simple functional relationship of the RF propagation effects so that uplink weights can be determined from uplink signals and some parameters of the remote user, for example, the angle of arrival of the uplink signals.

Other Methods

Known methods for determining array calibrations each have one or more associated drawbacks. Most known methods require external measuring equipment which may be expensive, unwieldy and cumbersome to use repeatedly. Secondly, conventional calibration methods are sensitive to drifts in system parameters, such as frequency references, over the extended period of time during which measurements are being taken, and these drifts result in inaccuracies in the measured array calibrations. In addition, some known techniques only determine multiplicative rather than convolution kernel calibrations despite the need to calibrate frequency dependent components in the antenna array. In order to eliminate this frequency dependence and still use multiplicative calibrations, it is necessary to calibrate the antenna array for each frequency channel of communication. Thirdly, the transfer characteristics of the RP electronics depend on changing ambient conditions such as temperature and humidity which make it essential that antenna arrays be repeatedly calibrated in their ambient environment.

Harrison et al. disclose in U.S. Pat. No. 5,274,844 (Dec. 28, 1993) a method for calibrating transmit and, separately, receive chains (as complex valued vector transfer functions) in two experiments which involve a data bus connecting a resource controller to a remote terminal. In the first experiment, the data bus indicates to the remote terminal to send a known signal to the base station. This determines the receive apparatus chain calibration. In a second experiment, the signals received at the remote terminal are sent back to the resource controller via the data bus to enable determining the transmit apparatus chain calibration.

Co-owned U.S. Pat. No. 5,546,090, issued Aug. 13, 1996 and assigned to the assignee of the present invention, discloses a calibration method which can determine both transmit and receive calibrations using a simple transponder co-located with the remote terminal that retransmits to the base station the signals received at the remote terminal from the base station. Such a method does not require the wired data-bus of the Harrison et al. invention. Still, additional transponder equipment is required.

PCT Patent application publication WO 95/34103 (published Dec. 14, 1995) entitled ANTENNA ARRAY CALIBRATION, Johannisson, et al., inventors, discloses a method and apparatus for calibrating the transmission (and reception) of an antenna array. For transmit calibration, an input transmit signal is inputted into each antenna element one antenna at a time. After the input transmit signal has passed through a respective power amplifier, the signal transmitted by each antenna element is sampled by a calibration network. The resulting signal is fed into a receiver, and a computation means relates the received signal with the original transmit signal for each antenna element. Correction factors can then be formed for each antenna element. The antenna elements may then be adjusted (in amplitude and phase, or in-phase I and quadrature Q components) using the correction factors so as to ensure that each element is properly calibrated during transmission. For receive calibration, a known input signal is generated and injected using a calibration network (a passive distribution network) into each antenna element of the antenna array. The signals pass from the antenna elements through respective low noise amplifiers, and the signals thus received by each antenna element are measured by a beam forming apparatus. The beam forming apparatus can then generate correction factors by comparing the injected signal with the measured signals so as to individually calibrate each antenna element. The correction can be described as amplitude and phase corrections, or as corrections in in-phase I and quadrature Q components.

U.S. Pat. No. 5,530,449 to Wachs et al. entitled PHASED ARRAY ANTENNA MANAGEMENT SYSTEM AND CALIBRATION METHOD (herein under "Wachs") describes a management system and calibration method for use with a phased array antenna that employs a system level measurement of amplitude and phase, conducted during nodal operation, to determine on an element by element basis, the tracking performance of individual chains for the antennas. The system and method measure the amplitude and phase of individual element chains utilizing probe carriers. The required correction coefficients for each chain are determined from the measured amplitude and phase data, and each individual element chain is individually compensated to remedy the amplitude and phase errors. The system separately calibrates forward and return link phased array antennas on a phased array antenna communication station which is on a satellite. In one embodiment, a separate remote calibration station is used. For calibrating the transmit paths, the probe signal is transmitted to an antenna at the calibration system alternatively from one element (a reference element) and an element under test. The signals received at the calibration station are compared to determine the corrections. A separate communication link also is used to provide communication between the calibration station and the satellite. In the receive direction, the remote calibration station is used to transmit to all antenna elements of the phased array, but only two elements are alternately sampled to form the calibration carrier. The calibration carrier is then downlinked at Ka band to a gateway hub station for computation. In an alternate embodiment, a local sense antenna at the satellite's communication station is used to sample outputs of the transmit antenna elements. In both embodiments, separate calibrations are carried out for receive and transmit paths, and extra equipment is needed, either a separate remote calibration station, with an additional link, or a separate sense antenna system. Several features of Wachs' system are of note. First, additional hardware is required in the form of a separate calibration station or probe antenna. Second, special waveforms need to be used for that calibration, rather than ordinary communication waveforms supported by standard air interfaces. This means that the communication station needs additional hardware for forming and transmitting such waveforms, and the calibration station needs special receiving/demodulating hardware, and cannot reuse standard hardware. Thus there is a chance that a Wachs-like system adapted for use in a wireless communication system may not be allowed to operate in some countries.

Thus these known methods provide separate calibrations for the receive and transmit paths. The methods require special calibration apparatus. Some known methods and systems use special waveforms, and thus need additional hardware for processing such waveforms, and also do not conform to any established air interface standards, so face the risk of not being allowed to operate in some countries Those known systems that also calibrate for the different air paths between the base station antenna elements and the subscriber unit are more properly classified as spatial signature estimating techniques under the definition of calibration used herein.

Parish et al. in co-owned U.S. patent application Ser. No. 08/948,772 for METHOD AND APPARATUS FOR CALIBRATING A WIRELESS COMMUNICATION STATION HAVING AN ANTENNA ARRAY, describe a calibration method for a base station with an array of antenna elements that does not require any additional calibration apparatus. One aspect includes transmitting a prescribed signal from each antenna element using the transmit electronics of that antenna element while receiving the transmitted signal in at least one of the receiver electronics chains not associated with the antenna. This is repeated, transmitting prescribed signals from other antenna elements using other transmit apparatus chains until prescribed signals have been transmitted from all antenna elements for which calibration factors are required. Calibration factors for each antenna element are determined as a function of the associated transmit electronics chain and receiver electronics chain transfer functions. When downlink and uplink communication occurs in the same frequency channel, a single calibration factor is determined for any antenna element. In one version of the Parish et al. invention, the single calibration factor is in phase a function of the difference between the transmit apparatus chain transfer function phase and the receiver apparatus chain transfer function phase associated with a particular antenna element. In another aspect of the Parish et al. invention, the calibration factors so determined are used for determining a set of transmit weights from a set of receive weights.

While the Parish et al. invention enables determining a single set of calibration factors for the base station which enables a downlink set of weights to be determined from an uplink set of weights without requiring some additional apparatus such as a transponder, and calibrates for differences in base station electronics paths, the Parish et al. method cannot be adapted to estimate spatial signatures to deal with RF propagation path differences which may occur. In addition, the base station needs to enter a spatial calibration mode for carrying out the calibration experiment, and thus cannot be used for any other purpose during that time.

Also, there is no mention in the prior art of the capability of calibrating by combining measurements from a plurality of remote transceivers.

Desirable Features

The main purpose of the calibration process is to acquire calibration information for the base station. This may involve measuring the gain and phase differences between the uplink and downlink channels. Accuracy and high precision are of great importance during this procedure. If the calibration information is not accurate, then the beam pattern on the downlink will be highly distorted. As a consequence, less energy will be radiated toward the target user, and an excess amount of interference will be radiated toward co-channel users. This will have a negative effect on the downlink signal quality and on the downlink range. Ultimately, a bad calibration strategy may significantly reduce the capacity of the wireless network.

One desirable feature of a calibration method is that only a base station and a subscriber unit are needed for calibration with no further equipment such as signal generators, transponders, calibration stations, additional antennas, probes, or other equipment, being required. Such a system ideally should be able to calibrate for differences in both the receive and transmit electronics. Such systems also should use ordinary communication waveforms substantially conforming to the particular air interface standard of the wireless communication system in which they operate. This enables reusing standard hardware, and also ensures non-violation of standards and maintaining compatibility with any future modifications with standards. By "conforming to an air interface standard" we mean conforming to the channel structure and modulation of an air interface, where "channel structure" is a frequency slot in the case of FDMA, a time and frequency slot in the case of TDMA, and a code channel in the case of CDMA, and "modulation" is the particular modulation scheme specified in the standard.

Another desirable feature is that the method can be used for signature estimation in order to also account for differences in the RF paths.

Another desirable feature of a calibration method is ease of use and the ability to carry out the calibration rapidly and frequently, even for example, as frequently as several times a minute. This ultimately increases the downlink processing accuracy which has a profound effect on signal quality, capacity, coverage, and possibly other parameters.

Another desirable feature of a calibration method is that each and every subscriber unit supports calibration.

Another desirable feature for a calibration system is the ability to carry out some or all of the processing of received data for calibration within the subscriber unit, thus not requiring the subscriber unit to send the received data back to the base station and not requiring the base station to carry out all of the processing. The computational burden of the base station thus may be significantly reduced by "distributing" the load across intelligent subscriber units. This feature is particularly desirable, for example, for base stations that service many subscriber units, or that calibrate before each call or even several times during each call.

Another desirable feature is the ability to initiate calibration on any available conventional channel on the base station, for example, any carrier and any time slot of a FDMA/TDMA system. This further enhances flexibility since one can choose any timeslot and any carrier which is available for use at the moment.

Another desirable characteristic for a calibration method is the ability to calibrate a base station without having to take the base station off-line for calibration, thus enabling base station calibration to be performed while the base station services hundreds of calls, for example, in a FDMA/TDMA/SDMA system on other carriers (frequency slots)/timeslots/spatial channels. This feature is especially important for wideband base stations that service many conventional channels (e.g., carriers for an FDMA/TDMA system) at the same time.

Another desirable characteristic for a calibration method is the ability carry out rapid calibration even several times during an existing call.

Another desirable characteristic for a calibration method is the ability to carry out calibration in a seamless manner during an ongoing call so that a base station may be able to continuously calibrate itself during some calls.

Another desirable characteristic for a calibration method is the ability to carry out calibration with several remote transceivers by combining measurements, each of which may be able to "see" only a subset of a communication station's antenna array, or each of which may face a different interference environment.

Another desirable characteristic for a calibration method is the ability to determine whether calibration is accurate, for example by performing statistical measurements, together with the ability to feed back such information to the communication station to determine, for example, if the combining from several remote stations may be necessary.

Another desirable feature is high accuracy, with immunity to frequency offset, timing misalignment, I/Q mismatch, and phase noise that typically might occur in communication with inexpensive subscriber units.

Thus there still is a need in the art for a calibration method and apparatus that include all or most of the above characteristics. For example, the is a need for a system and method one that are accurate and simple, both in terms of the equipment necessary and the time required, so that calibration can be performed repeatedly and rapidly wherever and whenever desired. There also is a need in the art for a simple calibration technique that only uses existing base station electronics and does not require special calibration hardware. There also is a need in the art for a method that enables one to determine transmit weight vectors from receive weight vectors, including calibrating for the receive electronics and transmit electronics, the calibration obtained using simple techniques that use existing base station and subscriber unit electronics and do not require special calibration hardware.

Thus there still is a need in the art for efficient methods that determine uplink spatial signatures for correcting for the differences in uplink RF paths and receive electronics and downlink spatial signatures for correcting for the differences in downlink RF paths and transmit electronics.

SUMMARY

An feature of the present invention is enabling calibrating a communication station having an antenna array for differences in electronics paths, the calibration using only the communication station and a subscriber unit.

Another feature of the invention is providing calibration that enables using a calibrated transmit weight vector, the transmit weight vector essentially determined from a receive weight vector, the calibration taking into account differences in electronics paths.

Another feature of the invention is determining spatial signatures that enable using a calibrated transmit weight vector, the transmit weight vector essentially determined from a receive weight vector, the calibrating taking into account differences in electronics paths and RF propagation paths.

Another feature of the invention is enabling determining the uplink spatial signature of a subscriber unit communicating with a communication station, the determining using only the communication station and the subscriber unit.

Another feature of the invention is enabling determining the downlink spatial signature of a subscriber unit communicating with a communication station, the determining using only the communication station and the subscriber unit.

Still another feature of the invention is calibrating a communication station having an antenna array that the calibrating easy and without taking the communication station off the air for those conventional channels not currently being calibrated.

Still another feature of the invention is calibrating a communication station having an antenna array, the calibrating able to be carried out partially or in total at a subscriber unit.

Still another feature of the invention is calibrating a communication station, the calibrating method providing high accuracy, with immunity to frequency offset, timing misalignment, I/Q mismatch, and phase noise that typically might occur in communicating with inexpensive subscriber units.

Another feature of the invention is providing a calibration method and apparatus that can be readily implemented in a radio frequency system and that make it practical to perform frequent and routine system calibration, the calibration enabling the use of a calibrated transmit weight vector, the transmit weight vector essentially determined from a receive weight vector, the calibration including correcting for differences in electronic paths and for differences in RF propagation effects.

Yet another feature is enabling rapid calibration even several times during an existing call.

Yet another feature is enabling carrying out calibration in a seamless manner during an ongoing call so that a communication station may be able to continuously calibrate itself during a particular call.

Yet another feature is the ability to carry out calibration with several remote transceivers by combining measurements, each of which may be able to "see" only a subset of a communication station's antenna array, or each of which may face a different interference environment.

Yet another feature is providing the ability to determine whether calibration is accurate, for example by performing statistical measurements, together with the ability to feedback such information to the communication station to determine, for example, if the combining from several remote stations may be necessary.

These and other features will become clear from reading the detailed description of the preferred embodiments of the invention provided herein below

BRIEF DESCRIPTION OF THE DRAWINGS

The present invention will be more fully understood from the detailed description of the preferred and some alternate embodiments of the invention, which, however, should not be taken to limit the invention to any specific embodiments, but are for explanation and better understanding only. The embodiments in turn are explained with the aid of the following figures.

DETAILED DESCRIPTION OF THE PREFERRED EMBODIMENTS

A Note on Reference Numerals

Figure 1:
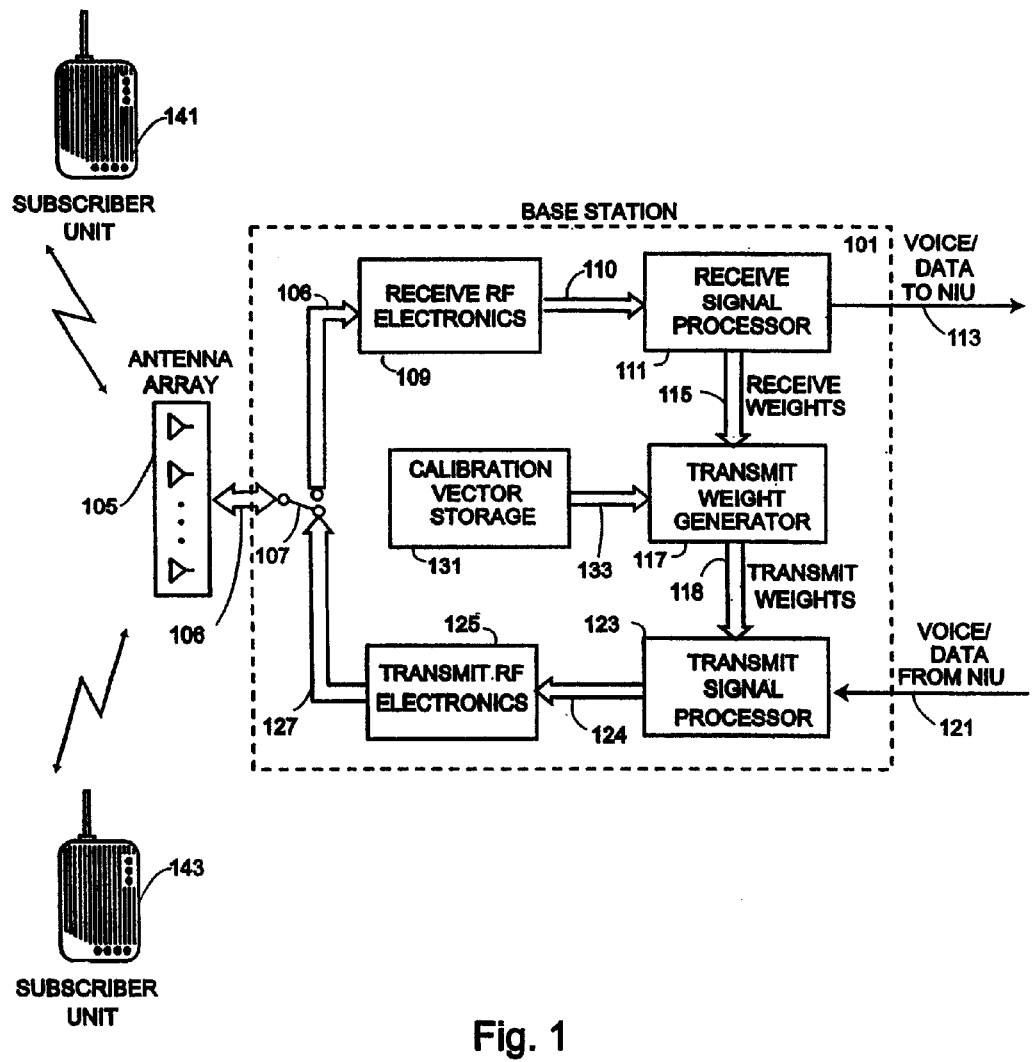
FIG. 1 shows the uplink and downlink signal flow on the base station.
Figure 9:
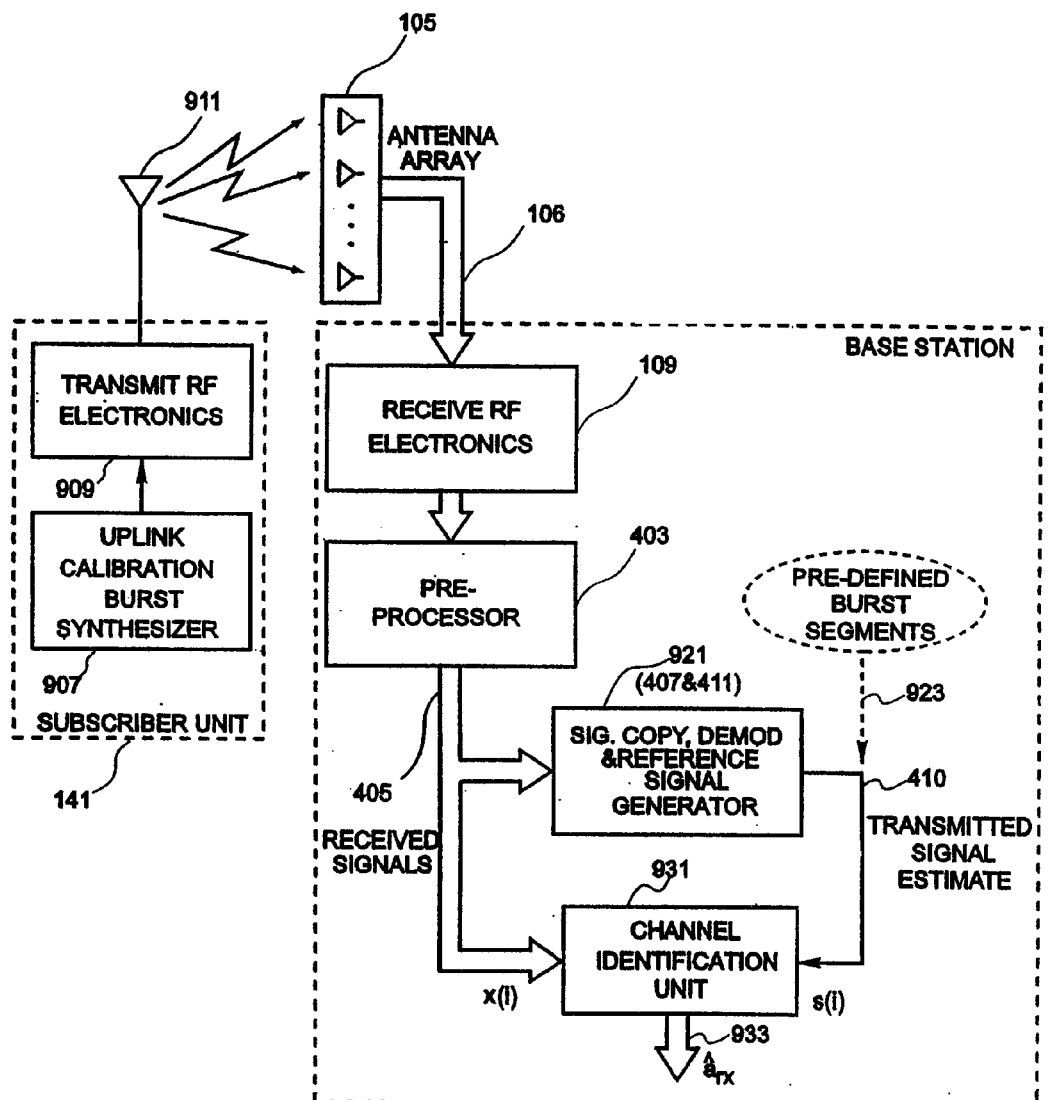
FIG. 9 illustrates the uplink signature estimation at the base station.
Figure 10:
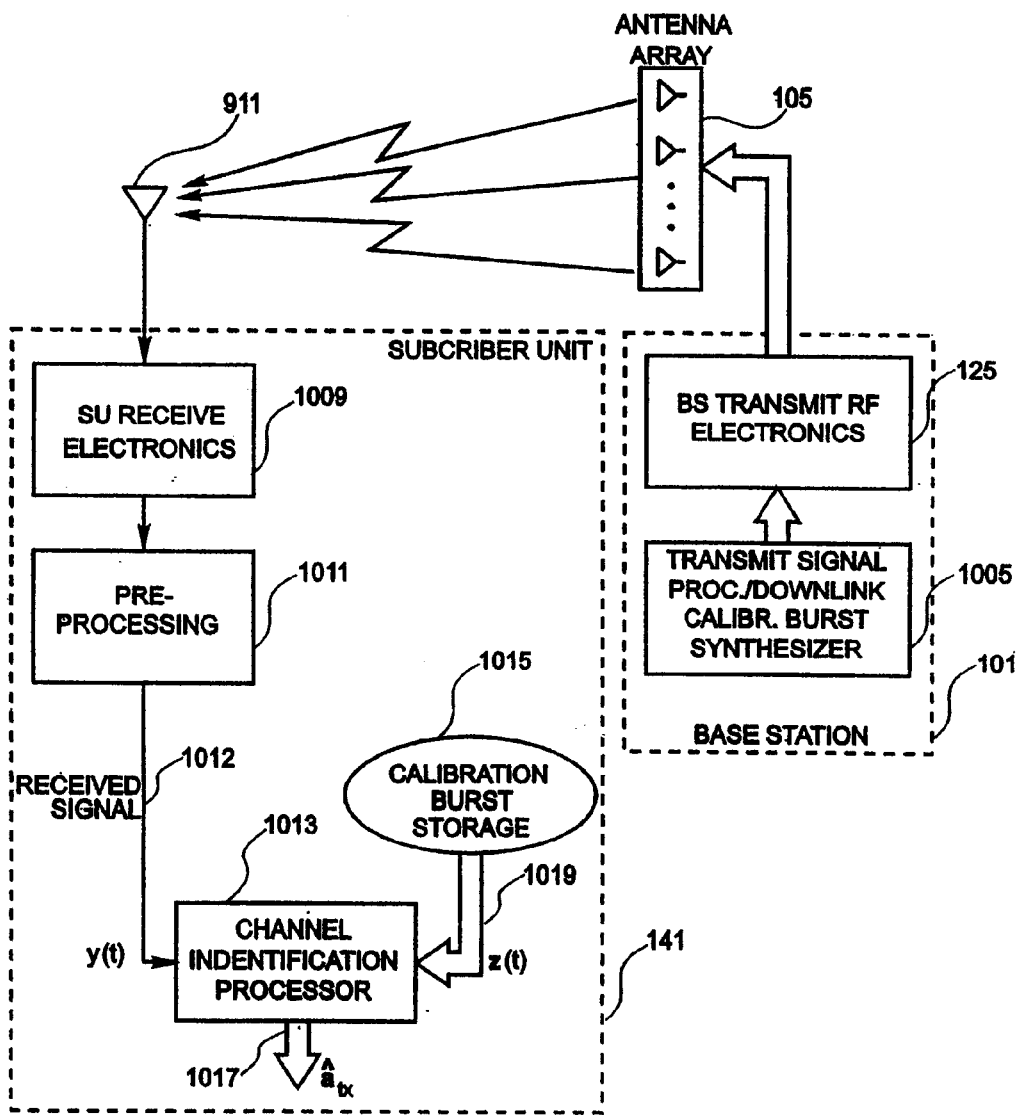
FIG. 10 shows the downlink signature estimation at the subscriber unit.

The first one or two digits in a reference numeral indicate on which figure that reference numeral is first introduced. Reference numerals between 100 and 199 are first introduced in FIG. 1, those between 200 and 299 are first introduced in FIG. 2, and so forth. For example, reference numeral 111 is first introduced in FIG. 1, 909 is first introduced in FIG. 9, 1009 is first introduced in FIG. 10, and 1211 is first introduced in FIG. 12.

General System Description

The invention preferably is implemented in wireless cellular communication systems which include a base station (i.e., a transceiver, a communications station) with a multiple antenna array that uses smart antenna techniques for uplink or downlink communication or both. The preferred implementation is in a system that operates using the Personal Handyphone (PHS) air interface communication protocol. Two implementations are one in which the subscriber units are fixed in location, and the other in which subscriber units may be mobile. Above-mentioned and incorporated-herein-by-reference co-owned U.S. patent application Ser. No. 08/729,390 describes the hardware of a base station of a mobile system in detail, the base station preferably having four antenna elements. While the invention is useful for mobile and fixed subscriber unit situations, details are provided herein for incorporating the invention into a system with fixed location subscriber units. Wireless systems with fixed locations are sometimes called wireless local loop (WLL) systems. A WLL base station into which some aspects of the present invention are incorporated is described in U.S. patent application Ser. No. 09/020,049 for POWER CONTROL WITH SIGNAL QUALITY ESTIMATION FOR SMART ANTENNA COMMUNICATION SYSTEMS, incorporated-herein-by-reference, while the subscriber unit for use in such a WLL system is described in U.S. patent application Ser. No. 08/907,594 for METHOD AND SYSTEM FOR RAPID INITIAL CONTROL SIGNAL DETECTION IN A WIRELESS COMMUNICATION SYSTEM. The WLL base station described in above-referenced U.S. patent application Ser. No. 09/020,049 includes SDMA and may have any number of antenna elements, and many of the simulations described herein will assume a six-antenna array. It will be clear to those of ordinary skill in the art that the invention may be implemented in any smart antenna based system using any air interface with one or more than one spatial channel(s) per conventional channel, and having mobile, fixed, or a combination of mobile and fixed subscriber units. Such a system may be analog or digital, and may use frequency division multiple access (FDMA), code division multiple access (CDMA), or time division multiple access (TDMA) techniques, the latter usually in combination with FDMA (TDMA/FDMA).

Note that while the preferred embodiment is to apply the invention in a wireless communication system having base stations, each base station having subscriber units, the invention also is applicable to peer to peer communication from one radio to another. There is no inherent need to define the concept of a base station or subscriber unit, and how to modify this description to accommodate the peer-to-peer case would be clear to one of ordinary skill in the art. Therefore, while the invention is described as being implemented in a communication station and a subscriber unit, the communication station in this context may be any radio transceiver equipped with an antenna array, and the subscriber unit may be any other radio transceiver remote to the array-equipped transceiver and able to communicate with the array-equipped transceiver using some modulation scheme. While the preferred embodiment describes a base station that has a single array for both uplink (receive) processing and downlink (transmit) processing, with means for adaptive smart antenna processing on the uplink and the downlink, the invention also is applicable to a base station that has an array only for transmit processing, and for a base station that uses a separate antenna array for uplink processing and for downlink processing. When only a single antenna is used for receiving signals, the calibration factor is the downlink signature since all received signals pass through the same receive electronics chain. Also, the "number" of antenna is clearly the number of "active" antennas, that is, the number of antenna used for communication.

While the calibration is intended in the embodiments described herein for use in adaptive smart antenna processing, the calibration may be for any other purpose, so that the antenna-array-equipped transceiver need not even include means for adaptive smart antenna processing.

FIG. 1 depicts the uplink and downlink signal flow through a typical base station (BS) on which the present invention may be embodied. Base station 101 includes an array of antenna elements 105. The base station communicates with one or more subscriber units such as subscriber unit 141 and subscriber unit 143. In the preferred embodiment the base station has a single array of antenna elements that are used for both receive and transmit, so that a receive/transmit unit 107 is used. For frequency domain duplexing unit 107 is a frequency duplexer and for time domain duplexing (TDD), such as used in the preferred embodiment, unit 107 is a switch. On the uplink, signals from the subscriber units are received at the main antenna array. Those signals 106 pass through the switch 107 set to the receive position and these signals pass through the receive RF electronics 109. In this description, all the characteristics of the receive RF electronics, including all the cables and the switch characteristics and the RF receivers, and other receive paths, are all lumped together. The receive RF electronic unit 109 converts the RF signals to baseband signals 110. In the preferred embodiment, receive RF electronics unit 109 includes analog RF components, including analog downconversion, analog to digital converters, and digital downconverter components to produce digital baseband antenna signals 110, and these baseband received antenna signals are processed by receive signal processor 111 to generate a received signal from a particular subscriber unit, for example subscriber unit 141. The receive signal processor includes determining a weighted sum of the complex valued (in phase I and quadrature Q) antenna signals in an optimal manner where the weighting is in amplitude and phase, and where optimal means that the desired signal components are enhanced by a maximum amount and the non-desired components are suppressed by a maximum amount.

The complex valued receive weights are computed by locking onto a known training sequence, or by using some decision-directed technique, or "blindly" by using some other special structure in the signal. In general, it is not essential to know the phase and amplitude relations of the receive electronics in order to perform the computation of the uplink (i.e. receive) weights. See below and in above-referenced co-owned U.S. patent application Ser. No. 08/729,390 filed Oct. 11, 1996 for more details on how these weights are computed.

FIG. 1 shows the output of the receiver part of the base station as being voice or data 113 with signals which are directed to the Network Interface. Unit (NIU). Thus, as shown in FIG. 1, receive signal processor 111 also includes all the demodulation function.

On the downlink the base station receives voice/data from the NIU denoted 121 in FIG. 1. The signal is modulated according to the system specification. A transmit signal processor 123 includes distributing complex valued weighted copies 124 of the modulated baseband signal (the weighting according to a set of complex valued transmit weights), and the weighted transmit antenna signals are fed to transmit RF electronics unit 125 to generate a set of RF transmit signals 127, one signal aimed at each antenna element of antenna array 105. These RF antenna signals are fed to the corresponding antenna array element through TX/RX switch 107 which is set in the transmit position. The transmit weights are chosen so that the antenna array radiates most of the energy towards a particular subscriber unit ("beam-forming") and it transmits minimal energy toward co-channel users ("null-placing"). In the preferred embodiment the set of transmit weights 118 is computed directly from the set of receive weights 115 generated by receive signal processor 111, and the computation is carried out by transmit weight generator 117 in real time. However, during this computation the transmit weight generator 117 must take into account the gain and phase differences between the uplink and downlink propagation channels where the channels include both the air path from and to a subscriber unit and the variation among the different signal parts within the receive RF electronics and also within the transmit RF electronics. In the preferred embodiment this information is stored in calibration storage unit 131 in the form of a calibration vector 133 as will be described below. Determining this calibration information is the main goal of the present invention.

Uplink and Downlink Signal Path Descriptions

In this description, the number of elements in the base station antenna array 105 shall be denoted by M. Thus, on the uplink there are M signal paths from a subscriber unit, one to each of the M inputs of the receive signal processor 111. Similarly, on the downlink there are M signal paths, one from each of the M inputs of transmit signal processor 123 to the subscriber unit. Each of these signal paths is described herein by a complex valued number that characterizes the phase and amplitude distortion of a baseband signal. As a compact representation, in this description, the uplink and downlink channels thus are mathematically described by M-dimensional complex valued vectors denoted $a_{rx}$ and $a_{tx}$, respectively, where M is the number of elements in the base-station antenna array 105, and where each element in the vector represents the path associated with one of the antenna elements in array 105. Such a description is particularly accurate when the differences in propagation times from (or to) a remote subscriber unit and individual antenna elements (delay spread) are much smaller than the symbol period for a system that uses a digital modulation scheme, such as the system of the preferred embodiment. The vectors $a_{rx}$ and $a_{tx}$ may be recognized as the (un-normalized) uplink spatial signature and downlink spatial signature, respectively, for the subscriber unit for this base station.

Throughout the description, the uplink and downlink signatures, and the uplink and downlink weights, will all be described in baseband. It would be clear to those of ordinary skill in the art that the adaptive smart antenna processing, including any weighting in amplitude and phase, may alternatively be carried out in some other band, for example, in intermediate frequency or in the passband. In such a case, the signature and all its components similarly would be defined in that frequency band.

The main goal of the invention is to calibrate the base station. Assuming identical RF propagation on the uplink and downlink, a single subscriber unit can be used together with its base station to carry out the calibration. It also will be apparent that the method enables the separate determination of the uplink and downlink signatures for any subscriber unit. The ease with which such data can be obtained enables one to obtain complete signature information for any (and even every) active subscriber unit. Therefore, in addition to calibrating the base station by running a simple calibration experiment with one of the subscriber units, the method enables subscriber dependent uplink and downlink signatures to be determined for any subscriber unit, these signatures including the effects of the electronic signal paths in the base station hardware and any differences between the uplink and downlink electronic signal paths for the subscriber unit. One use of such information is to determine separate calibrations for each subscriber unit when the RF propagation to and from the subscriber unit is different. Another use is for calibrating the base station, but rather than obtaining a single calibration vector using the base station and a single subscriber unit, using several subscriber units to determine the single calibration vector. In one embodiment, the single calibration vector is the average calibration vector. In another embodiment, it is the weighted average calibration vector, the weighting given to the estimate made using a particular subscriber unit dependent on a measure of the quality of the signal received by that subscriber unit, so that estimates from subscriber units having better quality signals are weighed more in the weighted average. A method and apparatus for determining signal quality is disclosed in above referenced U.S. patent application Ser. No. 09/020,049. The implementation of the signal quality estimation method is now described.

Denote by N the number of samples of a burst to use for the estimate. The sampled modulus information is first extracted by forming the sum of the squares of the in phase and quadrature received signals. The mean power and mean squared power are then determined using averages over the number of samples for the expectation operation.

$$\overline{R^2} = \frac{1}{N}\sum_{t=1}^{N} I^2(t) + Q^2(t), \text{ and}$$

$$\overline{R^4} = \frac{1}{N}\sum_{t=1}^{N} (I^2(t) + Q^2(t))^2.$$

Note that once the instantaneous power $R^2(t)=I^2(t)+Q^2(t)$ is determined, determining the squared power $R^4(t)=[R^2(t)]^2$ requires only a single additional multiplication per sample, and the estimated signal-to-interference-plus-noise-ratio (SINR) is determined as the signal quality estimate, preferably with at most one square root operation, using $$SINR = \frac{\sqrt{2 - \overline{R^4}/(\overline{R^2})^2}}{1 - \sqrt{2 - \overline{R^4}/(\overline{R^2})^2}}$$

$$= \frac{A - \sqrt{A}}{1 - A},$$

where $$A = \frac{2 - \overline{R^4}}{(\overline{R^2})^2}$$

Both the ratio $$\overline{R^4}/(\overline{R^2})^2$$

and the quantity A are sometimes called the kurtosis.

This preferred method of signal quality estimation is insensitive to frequency offset, and so is a particularly attractive method for use with the CM method which also is insensitive to frequency offsets.

In alternate embodiments, the single calibration vector estimate may be obtained using some other function of the several determinations of calibration vectors, for example, taking from each calibration vector only the good quality estimates of the element, and then combining all the subsets to obtain one high quality calibration vector.

Note that in the description below, the phase and magnitude distortions that occur in the various signal paths are described by the amplitude and phase, respectively, of a single complex valued number, so that a calibration for a one-to-M or M-to-one system is described by a M-dimensional complex valued vector. For a FDMA or FDMA/TDMA system, a different complex number may be required to describe the phase and magnitude distortions for each carrier (each frequency band).

Also note that often, while the electronics may be adequately described by a simple phase and amplitude factor, the RF propagation part within each frequency band of a carrier is not adequately described by a complex number, but is adequately described by a transfer function. Even in such a situation, with reciprocity in the RP paths between the uplink and downlink, the transfer functions cancel out when used for calibration, so that a complex number adequately describes the calibration for one antenna's uplink-downlink signal path, and a complex valued M-dimensional calibration vector is adequate.

Sometimes, even the signal paths through the receiver electronics or transmit electronics or both are not adequately describable by complex numbers, but are describable by transfer functions. In an alternate implementation, this is taken into account, so each of the uplink and each of the downlink signal paths is described by a complex valued transfer function for a baseband signal. How to extend the implementations described herein to take into account a set of frequencies rather than a frequency-independent (within a carrier band) phase and amplitude baseband signal path description would be clear to one of ordinary skill in the art, and the scope of this invention certainly includes such extension.

Figure 2:
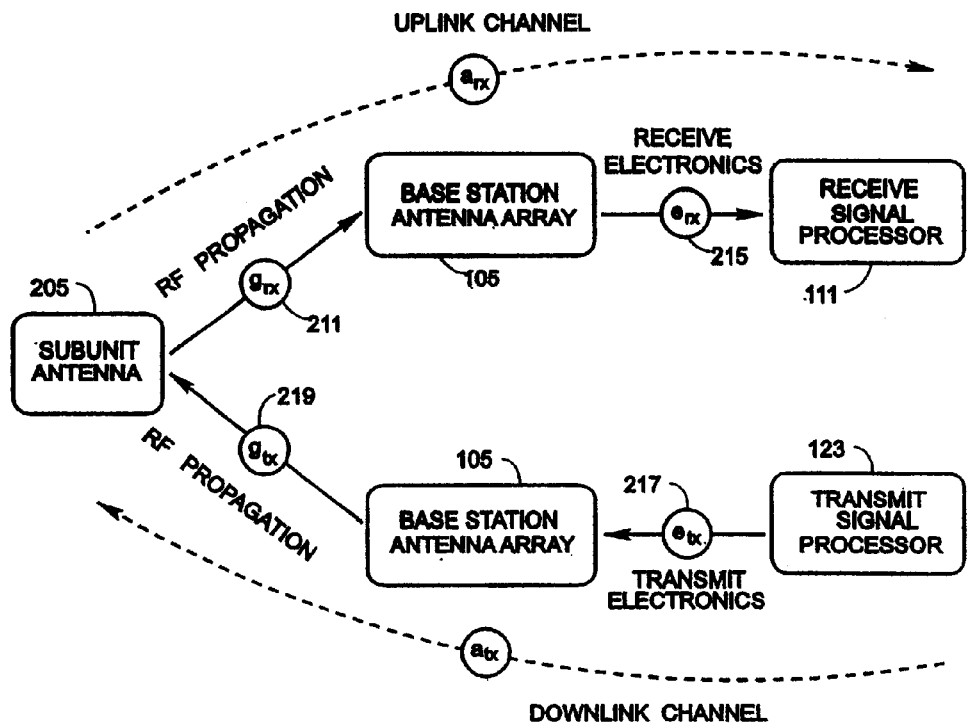
FIG. 2 shows the decomposition of the uplink and downlink channels into "propagation" and "electronic" factors.

FIG. 2 shows how the uplink and downlink channel descriptions are further mathematically decomposed into the product of "propagation" and "electronic" factors in the following manner. Between each base station antenna element (an element in 105) and the antenna 205 of the subscriber unit, there is a complex valued number that describes the phase and amplitude distortion that occurs in a baseband signal due to the RF propagation effects on the uplink and on the downlink. Such propagation effects include without limitation path loss, fading and shadowing effects, multipath, and near-field scattering. For each of the uplink and the downlink, the M such numbers can be combined as M-dimensional complex valued vectors. Define $g_{rx}$ and $g_{tx}$ as these vectors for the uplink and downlink, respectively. $g_{rx}$ and $g_{tx}$ are called the propagation factors herein. In a typical low-mobility environment the propagation factors remain constant over several frames (i.e., tens to hundreds of milliseconds).

Similarly, there is a complex valued number that describes the phase and amplitude distortion that occurs in a baseband signal due to the receive electronics between an element of the antenna array 105 and the corresponding output terminal of receive signal processor 111, and another complex valued number that describes the phase and amplitude distortion that occurs in a baseband signal in the transmit electronics chain between an input terminal of transmit signal processor 123 and the corresponding element of the antenna array 105. These electronics chain phase and amplitude distortions include those that occur due to cable losses, imperfect physical connections, variations in the gains of the various active receive or transmit RF electronics, and group delays in the particular components that are included in the RF electronics, for example surface acoustic wave (SAW) filters and other components. If the base-station hardware is stable, the electronic factors remain constant over an extended period of time (minutes, hours or days). There are M electronics based factors for each of the transmit and receive electronics chains. For each direction, these factors can be combined as an M-dimensional complex valued vector. Define receive electronic factor vector $e_{rx}$ as the vector of distortions of the M receive electronics chains, and transmit electronics factor vector $e_{tx}$ as the set of distortions for the M transmit electronics chains.

In FIG. 2 the uplink propagation factors vector $g_{rx}$ is shown as 211 and the uplink electronic factors vector $e_{rx}$ is shown as 215, while the downlink electronic factors vector $e_{tx}$ is shown as 217 and the downlink propagation factors vector $g_{tx}$ is shown as 219.

The multiplicative nature of these factors for each antenna element for each direction may be mathematically expressed as $$a_{rx} = g_{rx} \otimes e_{rx} \quad (1)$$
$$a_{tx} = g_{tx} \otimes e_{tx}$$

where $\otimes$ denotes the elementwise product (i.e., the Hadamard product).

Figure 3:
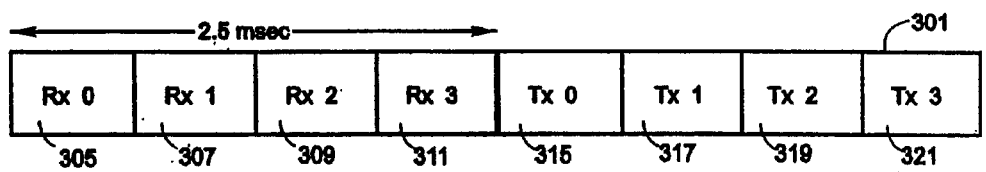
FIG. 3 illustrates the frame structure of a typical TDD system.

The preferred embodiment system is a frequency division multiple access/time division multiple access (FDMA/TDMA) system in which each conventional channel is a time slot in a frequency channel (a frequency channel is referred to as a "carrier" herein for FDMA/TDMA systems). In particular, time is divided into frames of timeslots and such a frame is shown as 301 in FIG. 3. Frame 301 of the preferred embodiment includes eight timeslots. In order, there are four receive timeslots labeled 0 through 3 (items 305, 307, 309, and 311) followed by four transmit timeslots labeled 0 through 3 (items 315, 317, 319, and 321) in FIG. 3. Thus, in the preferred embodiment, the uplink and downlink factors are measured over consecutive receive and transmit slots that are separated by a relatively short time interval. Therefore, by the principle of reciprocity, it is reasonable to assume that the uplink and downlink propagation factors are identical:

$$g_{rx} = g_{tx} \quad (2)$$

In an FDD system the relation between the uplink and downlink propagation factors may be more complicated, and can still be determined.

Uplink Weight Computation

Figure 4:
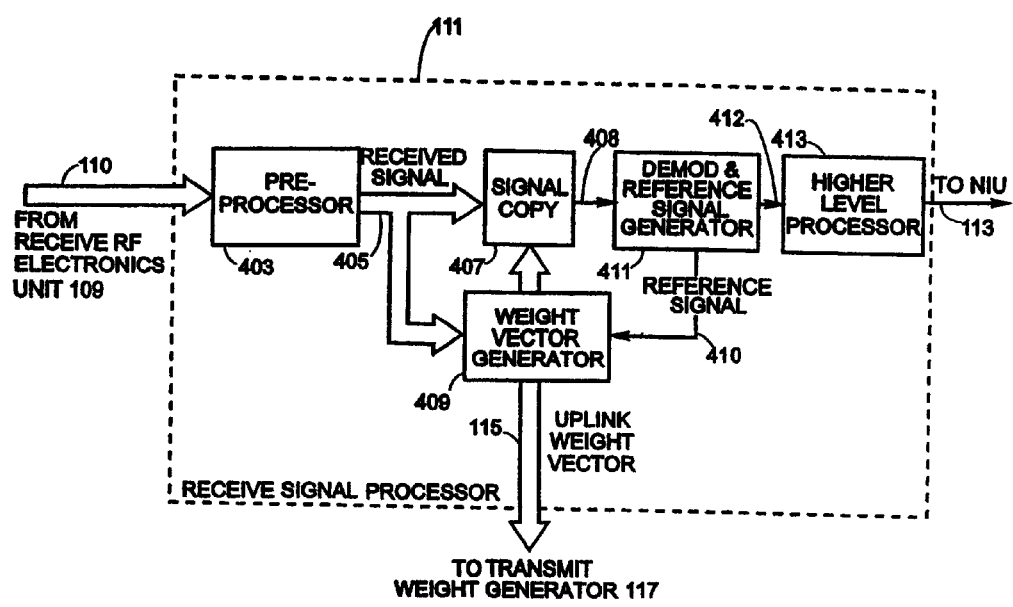
FIG. 4 shows the receive signal processor and the uplink weight computation.

In the preferred embodiment, the uplink weights are computed at base station 101 by receive signal processor 111. The uplink weights are summarized by a complex valued M-dimensional complex valued receive weight vector (also called uplink weight vector) 115 denoted by $w_{rx}$ herein, each element of which describes the weighing in amplitude and phase of the baseband received signals. The result of applying the weighting generates a baseband signal from the particular subscriber unit. Referring to FIG. 1, the received signals 106 from the antenna elements are digitized and converted to baseband by receive RF electronics unit 109. FIG. 4 shows the preferred embodiment (by programming) of receive signal processing unit 111, including receive (uplink) weights computation. Receive signal processor 111 first performs pass-band filtering, and compensates for frequency offset, timing offset, I/Q mismatch, and other possible distortions. These operations are commonly labeled as "preprocessing," and are carried out in the preprocessor shown as 403 in FIG. 4.

In the next step the transmitted symbol sequence 412 is estimated from the set of preprocessed received signals 405 by using a suitable spatial processing and demodulation technique. Referring to FIG. 4, an estimate of the signal from the particular desired subscriber unit is determined by spatial processor 407 by weighting in amplitude and phase by a set of receive weights described by a receive (uplink) weight vector 115.

Note that the invention also covers replacing spatial processor 407 with a spatio-temporal processor which includes time equalization. With spatio-temporal processing, the weighting is replaced by a convolution operation in the time domain, or equivalently, multiplication in the frequency domain. The convolution usually is finite and on sampled data, and so is equivalent to combining the spatial processing with time equalization using a time-domain equalizer with a finite number of equalizer taps. That is, each of the weights in the weight vector is replaced by a finite number of values. If the length of each convolving function is K, then rather than determining a complex valued M-weight vector $w_{rx}$, one determines a complex valued M by K matrix $W_{rx}$.

Note that a spatial weight determining method can easily be modified for spatio-temporal processing according to a weight matrix by re-expressing the problem in terms of matrices and vectors of different sizes. As throughout this description, let M be the number of antenna elements, and N the number of samples. Let K be the number of time equalizer taps per antenna element. A set of received signal samples can be written as a matrix of row vectors, each row vector representing the single samples from a single antenna. All the signal samples can then be represented by an (M by N) received signal matrix. To accommodate spatio-temporal processing, each row vector of N samples of the (M by N) received signal matrix can be rewritten as K rows of shifted versions of the first row to produce a received signal matrix of size (MK by N), which when pre-multiplied by the Hermitian transpose (i.e., complex conjugate transpose) of a weight vector of size (MK by 1) produces an estimated received signal row vector of N samples. The spatio-temporal problem has thus been re-expressed as a weight vector determining problem. For example, for covariance based methods, the weight vector is a "long" weight vector of size (MK by 1). Rearranging terms in the "long" weight vector provides the required (M by K) weight matrix. Therefore, while the description herein is in terms of weights and spatial processing, the scope is intended to include spatio-temporal processing.

Referring again to FIG. 4 and processor 407, at first, an estimate of the uplink weight vector 115 is used, for example the value from the previous frame. The signal estimate 408 is then demodulated by demodulator and reference signal generator 411 to generate the estimate of the transmitted symbol sequence 412 which then is further processed by higher level processing unit 413 to generate the voice or data signal 113 that is sent to the Network Interface Unit (not shown). In addition to producing the symbol sequence 412, demodulation and reference signal generator 411 also produces a reference signal 410 which is a modulated signal that is modulated by the estimated symbols and that has a correct signal structure according to the particular modulation protocol used. This reference signal, together with the preprocessed receive signal set 405, is used by weight vector generator 409 to generate a better estimate of the receive weight vector 115. Weight vector generator 409 implements an optimization method that determines the weight vector that minimizes an objective function of weight vectors, the objective function including a measure of the deviation of the signal generated through a signal copy spatial processing operation using the weight vector to the reference signal 410. In the preferred embodiment, the objective function also includes a term to limit the magnitude of the weight vector. The next estimate of the weight vector obtained from weight vector generator 409 can then be used by signal copy operation 407 and also may be used by transmit weight generator 117. For more details on the structure of the base station on which the method of the present invention is preferably implemented, see above referenced U.S. patent application Ser. No. 09/020,049. For further details of the uplink weight vector computation, see above-referenced U.S. patent application Ser. No. 08/729,390 and U.S. patent application Ser. No. 09/153,110 for METHOD FOR REFERENCE SIGNAL GENERATION IN THE PRESENCE OF FREQUENCY OFFSETS IN A COMMUNICATIONS STATION WITH SPATIAL PROCESSING.

Downlink Weight Computation

Figure 5A:
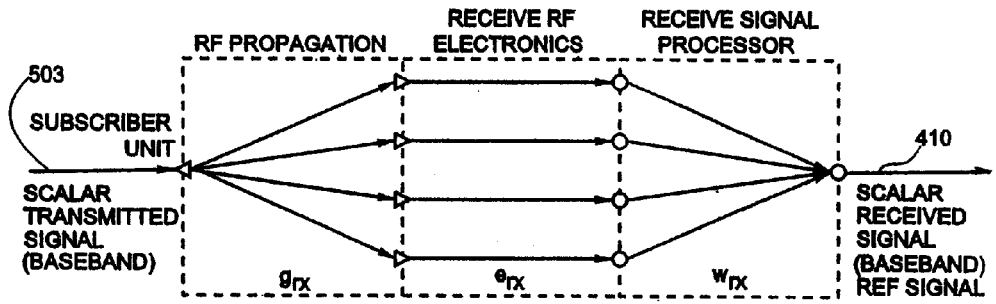
FIG. 5 illustrates the symmetry between the uplink and downlink signal paths.
Figure 5B:
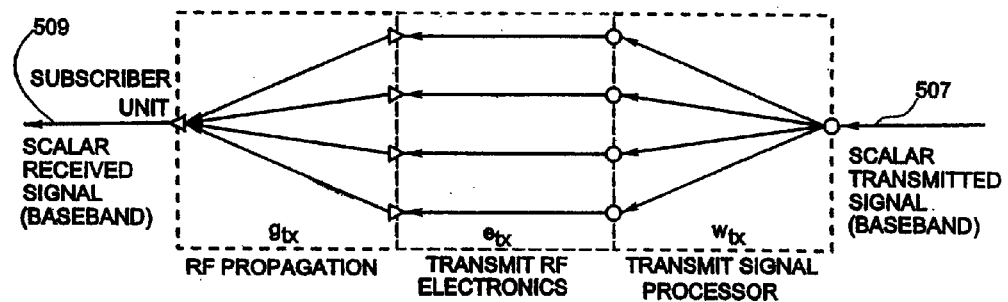

The downlink weights 118 may be expressed as an M-dimensional complex valued vector of weights $w_{tx}$ (called the transmit weight vector, also the downlink weight vector). In the preferred embodiment, the downlink weights are computed directly from the uplink weights. The symmetry of the uplink and downlink signal paths is used. This symmetry, illustrated in FIGS. 5A (uplink) and 5B (downlink), may be expressed as follows:

1. The impulse response of the scalar "channel" (in baseband) between the modulated baseband signal (shown as 503) transmitted by the subscriber unit and the post-spatial processing (i.e., demultiplexed) signal (for example, referring to FIG. 4, the reference signal 410) is substantially the same as the opposite direction impulse response from the pre-spatial processing scalar baseband signal 507 transmitted from the base station to the received baseband signal 509 at the subscriber unit. Mathematically, this symmetry may be stated as the uplink and downlink weight vectors substantially satisfying the equation $$w^*_{rx} a_{rx} = w^*_{tx} a_{tx} \quad (3)$$

2. For receiving from and transmitting to the same subscriber unit (assuming the subscriber unit uses the same antenna for receive and transmit), the beam pattern of the antenna array on the uplink and the downlink should be substantially identical. In the case that the reciprocity condition ($g_{rx}=g_{tx}$) substantially holds, this means that the weight vectors should substantially satisfy $$w_{rx} \otimes e_{rx} = w_{tx} \otimes e_{tx}, \quad (4)$$

where $\otimes$ denotes the elementwise product (i.e., the Hadamard product). Note that in general the beam pattern of the antenna array depends on the weight vectors, as well as on the transfer functions of the RF electronics.

Eq. (3) has many solutions for $w_{tx}$ while Eq. (4) has only one solution:

$$w_{tx} = w_{rx} \otimes e_{rx} \oslash e_{tx}, \quad (5)$$

where $\oslash$ denotes elementwise division. Consequently, the main equation that governs the transmit weight generation is given by $$w_{tx} = w_{rx} \otimes c, \quad (6)$$

where the calibration vector 133 (denoted by c) is defined as $$c = e_{rx} \oslash e_{tx}, \quad (7)$$

Figure 6:
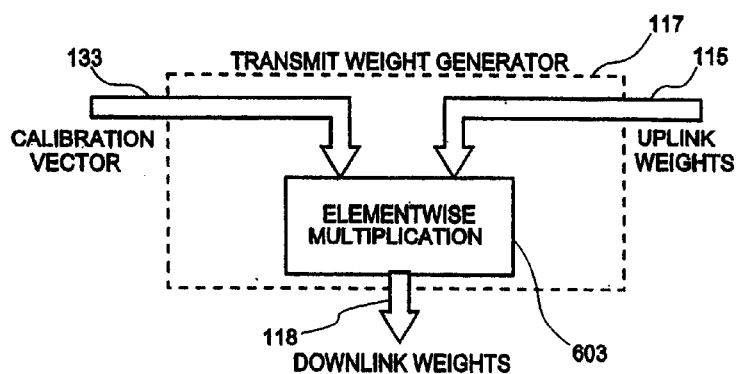
FIG. 6 shows the internal structure of the transmit weight generator.

The internal structure of the transmit weight generator 117 is depicted in FIG. 6. To generate an element of transmit weight vector 118, the corresponding element of calibration vector 133 is multiplied by the corresponding element of the receive weight vector 115 using elementwise multiplication process 603.

The Calibration Process

The main purpose of the calibration process is to determine calibration vector 133 for a base station and one of its subscriber units which supports the calibration procedure. No additional calibration equipment such as a transponder, signal generator, or measuring network is needed. In a typical TDD system the calibration process consists of the following steps:

1. Establish a connection with a suitable subscriber unit;
2. Estimate the uplink channel spatial signature $a_{rx}$;
3. Estimate the downlink channel spatial signature $a_{tx}$;
4. Assuming reciprocity, compute the calibration vector 113 as $$c = a_{rx} \oslash a_{tx} = e_{rx} \oslash e_{tx}; \quad (8)$$

5. Terminate the connection with the subscriber unit.

Clearly in order to determine calibration functions, one need not explicitly display or store uplink and downlink signatures (steps 2 and 3 above) and one may instead proceed directly to step 4 of computing the calibration function from intermediate quantities related to the uplink and downlink signatures. For the purposes of this invention the computation of the calibration function from such intermediate quantities is equivalent to computing the calibration function from uplink and downlink signatures.

In the current WLL system in which the preferred embodiment is implemented, each subscriber unit is able to support the calibration method. Nevertheless, to maximize the signal to noise ratio, it is generally recommended to choose a subscriber unit that is close to the base station. Calibration calls can be initiated on any carrier and any time slot while the base station is servicing standard traffic channel (TCH) calls on other carriers and time slots.

Note that while the description herein is for the calibration to occur by the base station communicating with a subscriber unit, the scope clearly includes the base station communicating with a special purpose transceiver that performs the functions described herein, while not necessarily performing any other functions, for example the typical functions a typical subscriber unit performs. For example, one can use a subset of the hardware and software included in a subscriber unit to carry out the calibration.

Note that the preferred embodiment uses a system in which communication occurs burst-by-burst. Hence, the description herein uses the term "burst" and used terms such as traffic bursts, calibration bursts, etc. The invention certainly is not limited to burst-by-burst systems. The general equivalent term to "burst" applicable to both burst-by-burst and non burst-by-burst systems used herein is "waveform", and therefore a "calibration waveforms" is a calibration burst for a busts-by-burst system, a "traffic waveforms" is a traffic (or TCH) burst for a busts-by-burst system, and so forth.

Figure 7:
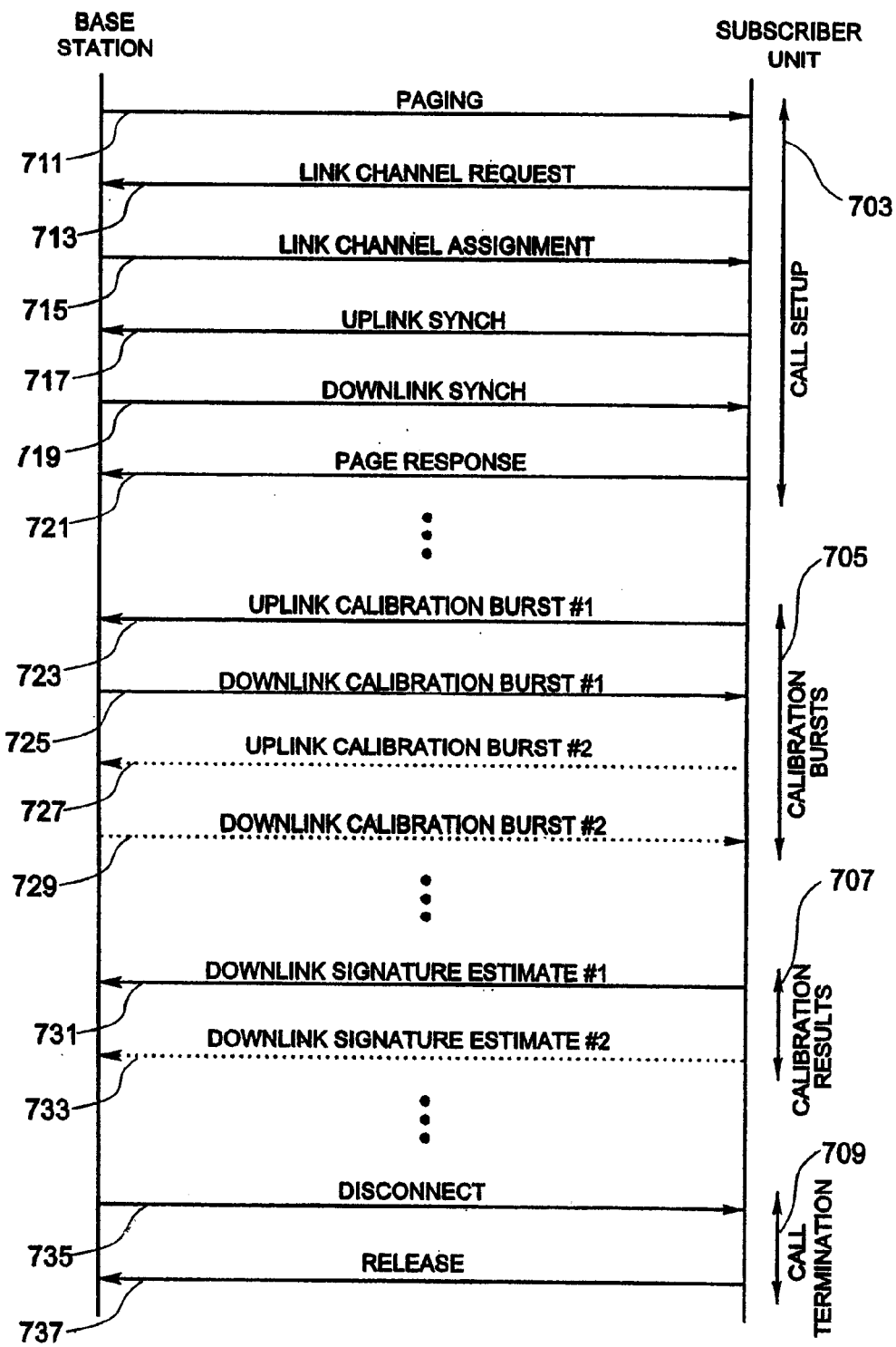
FIG. 7 shows the protocol sequence during calibration.

FIG. 7 shows a typical protocol which includes a calibration call according to aspects of this invention. Different protocols may be designed for other implementations. The sequence order is from top to bottom. The direction of arrows shows the direction of communication. The protocol starts with a standard call-setup procedure 703 which includes a paging call 711 from the base station to the subscriber unit, a link channel request 713 from the subscriber unit to the base station, resulting in link channel assignment sent to the subscriber in step 715. Synchronization ("SYNCH") bursts are then sent on the uplink (717) then on the downlink (719). Finally, in step 721, the page response is sent to the base station. For the calibration burst phase 705 of the protocol, the subscriber unit transmits a first uplink calibration burst or bursts (723) so that the base station can estimate the uplink channel. Immediately after this, in step 725, the base station transmits a first downlink calibration burst (or bursts) so that the subscriber unit can estimate the downlink channel.

Note that in the preferred embodiment, the calibration bursts are calibration waveforms that conform to the particular air interface standard, in this case, the PHS standard. By "conforming to an air interface standard" we mean conforming to the channel structure and modulation of an air interface, where "channel structure" is a frequency slot in the case of FDMA, a time and frequency slot in the case of TDMA, or a code channel in the case of CDMA, and "modulation" is, for example, $\pi/4$-DQPSK in the case of PHS, or GMSK in the case of GSM, and so forth. In the two-tone and multi-tone calibration methods described herein under, the calibration waveform consists of a sum of two or more waveforms each conforming to the PHS air interface standard. As such sums occur naturally in a multiuser communication system with frequency reuse, a sum of waveforms conforming to an air interface standard is also considered to conform to an air interface standard for the purpose of this description.

While one implementation would be to calibrate the whole antenna array at once, in the preferred embodiment, one considers not the whole array of M antenna elements, but subarrays of the array, each of less than M elements, and calibrates each subarray independently. In this preferred implementation, one or more additional uplink calibration bursts and one or more additional downlink calibration bursts may needed, each for each additional subarray, and these additional steps are shown as dotted lines 727 and 729, respectively in FIG. 7. Note that while only one downlink and one uplink additional step is shown dotted, it is to be understood that this represents as many additional bursts as there are additional subarrays to be calibrated.

Figure 8:
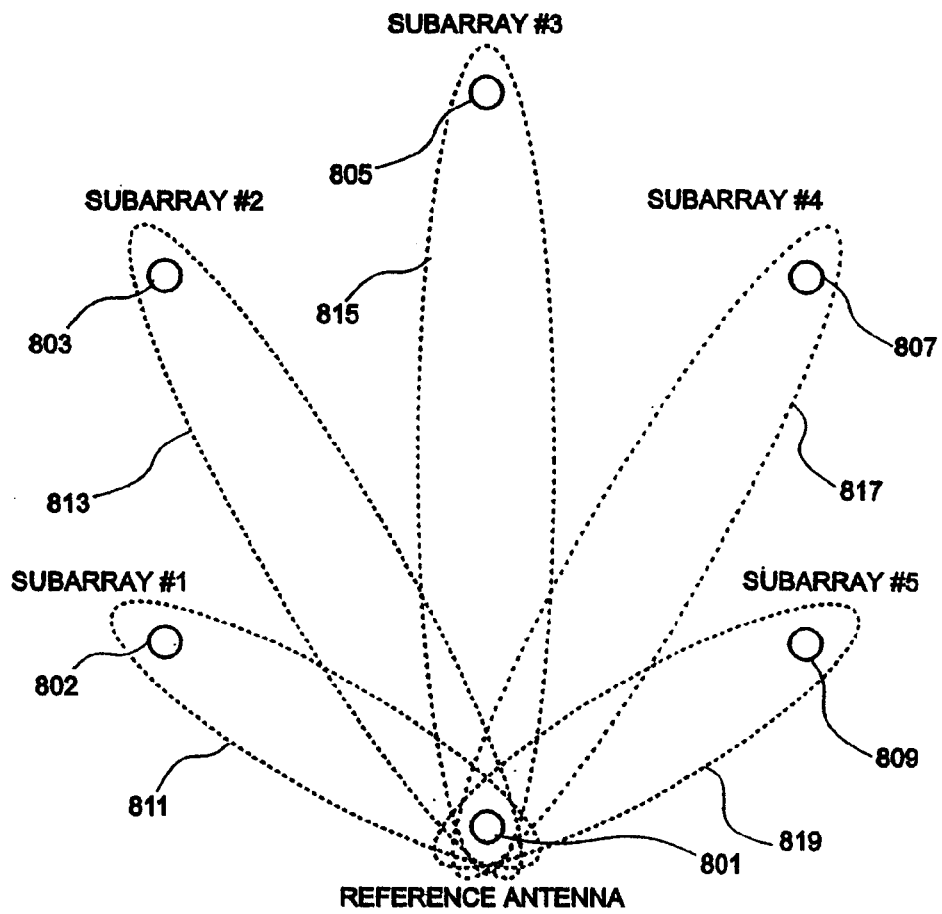
FIG. 8 illustrates the decomposition of a 6-element circular array into 2-element subarrays.

In the particular implementation, the antennas are calibrated pairwise with each antenna calibrated with respect to a fixed reference antenna. Thus, the M-element antenna array is viewed as a collection of 2-element subarrays and there are M−1 bursts used to calibrate in each direction (steps 727 and 729 each carried out M−2 times). FIG. 8 shows a circular arrangement of 6 antennas 801, 802, 803, 805, 807, and 809, with antenna 801 arbitrarily chosen as the fixed reference antenna. The subarrays are shown as the antennas within the dotted line areas. The five subarrays are: subarray #1 (811) of antennas 801 and 802, subarray #2 (813) of antennas 801 and 803, subarray #3 (815) of antennas 801 and 805, subarray #4 (817) of antennas 801 and 807, and subarray #5 (819) of antennas 801 and 809.

In the preferred embodiment, the subscriber unit has some intelligent signal processing capabilities which allow it to analyze the downlink calibration burst or bursts. In general, some of the downlink channel estimation can then be carried out by the remote subscriber unit, this part of the signature estimation determining partial results, called "downlink signature related signals" herein. In the preferred embodiment, the subscriber unit has sufficient processing power to completely compute the downlink channel estimate, and in this case, the downlink signature related signals are the downlink channel estimate components. These results (whether complete or partial estimates—in general, downlink signature related signals) are sent back to the base station by using some standard messaging protocol, including without limitation SACCH, FACCH, TCH payload as described in the PHS protocol. The PHS protocols are incorporated herein by reference. The PHS standard is described, for example, in the Association of Radio Industries and Businesses (ARIB, Japan) Preliminary Standard, Version 2, RCR STD-28 and variations are described in Technical Standards of the PHS Memorandum of Understanding Group (PHS MoU—see http://www.phsmou.or.jp). This sending is shown as step 731 for the first downlink calibration burst and as dotted line 733 for those implementations that use additional bursts, for example for the remaining subarrays. Other relevant information (e.g., signal quality estimates or the raw I/Q samples) can also be transmitted back to the base station from the subscriber unit for use in power control and for other analyses and purposes. See above referenced U.S. patent application Ser. No. 09/020, 049 for a description of the power control and signal quality estimation aspects of a subscriber unit.

At the end of the calibration process, the base station computes the calibration vector and terminates the calibration call. The call termination 709 preferably includes a disconnect command 735 from the base station followed by a release message 737 from the subscriber unit.

Uplink Signature Estimation

In the preferred embodiment, uplink signature estimation occurs at an active subscriber unit in the vicinity of the base station. After the service channel is established, the subscriber unit transmits an uplink calibration burst towards the base station. In our particular implementation, the uplink calibration bursts are idle (no-payload) TCH bursts. In alternate embodiments, other sequences can be used, and how to modify the method to use other sequences would be clear to one of ordinary skill in the art. For example, in another embodiment, downlink signature estimation is carried out first. The downlink signature related signals computed at the subscriber unit, which preferably are the signature estimates, are then transmitted to the base station. These signals are then used to estimate the uplink signature.

Figure 12:
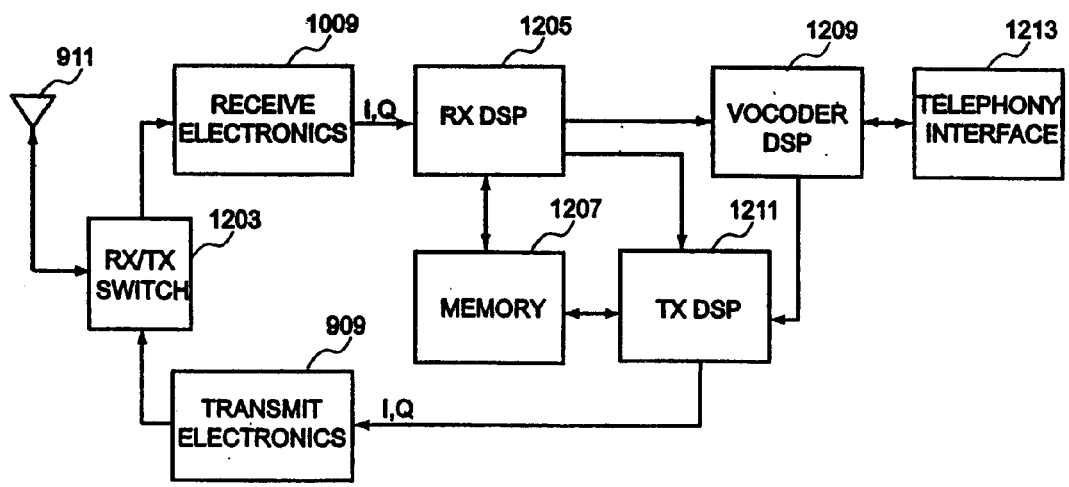
FIG. 12 shows the architecture of a typical subscriber unit in which aspects of the present invention may be implemented.

FIG. 9 describes the elements for determining the uplink signature $a_{rx}$. In the preferred embodiment, subscriber unit (e.g., unit 141) includes an uplink calibration burst synthesizer 907 implemented as a set of programming instructions on a signal processor. Synthesizer 907 includes a memory (part of the already present signal processor memory), and generates the first calibration burst (in step 723) or the second calibration burst (in step 727). The burst is transmitted from the subscriber unit antenna 911 using the subscriber unit's transmit RP electronics 909. The architecture of the preferred embodiment subscriber unit is described in above referenced U.S. patent application Ser. No. 08/907,594 and in FIG. 12. Referring to FIG. 12, time duplexer 1203 is in the transmit position during transmission and connects the output of transmit RF electronics 909 to antenna 911. Normal traffic burst signals are obtained from telephony interface unit 1213 via a vocoder DSP 1209. The complex valued (I, Q) samples are formed in a DSP device (TX DSP 1211) which is connected to a memory 1207 shared with another DSP device, the RX DSP 1205 used for signal reception. For the uplink channel determination implementation described herein, TX DSP 1211 is programmed to carry out the function of uplink calibration burst synthesizer 907 in addition to its normal transmit signal processing functions. The uplink calibration bursts are received by the base station antenna array 105 and converted to the baseband signals 110 by the receive RF electronics 109, as shown in FIG. 9. The signals from the antenna elements are then processed by the receive signal processor 111 which is made up of one or more digital signal processing devices (DSPs) programmed to carry out the functions of the elements 403, 921, and 931. Pre-processor 403 carries out pre-processing which includes baseband filtering, and removing the frequency offset, the timing offset, and the I/Q mismatch from the received signal. In some implementations, baseband equalization may also be included in the pre-processor 403 if necessary, and how to so include equalization and would be clear to those skilled in the art and is not the main concern of the invention. Unit 921 includes units 407 and 411 and estimates the transmitted symbol sequence (a reference signal) by carrying out the signal copy operation, demodulation and reference signal generation. In the preferred embodiment, the subscriber unit transmits standard TCH bursts, and therefore the default TCH demodulation method of the base station can be used for this purpose. In an alternate embodiment, the subscriber unit transmits a pre-defined calibration sequence that is explicitly known, and thus may be pre-stored at the base station. In this case, it is not necessary to demodulate the received signal. This alternate is shown in dotted lines in FIG. 9, where the pre-defined burst segments 923 are used instead of the transmitted signal estimate 410. Channel identification unit 931 uses the transmitted signal estimate 410 and received signals 405, which are the input and output signals respectively, of the uplink channel, 933 to estimate the underlying spatial signature 933. Any standard system identification technique may be used in channel identification unit 931. The following method is used in the preferred embodiment. N samples of the received signals 405 and the transmitted signal estimate 410 are used. In the preferred embodiment, N=50. That is, just 50 samples of the burst are used. Denote by k the time index of the N samples, where k=0,1, . . . , N−1, by x(k) vector of received signals 405 at time k, and by s(k) transmitted signal estimate 410 at time k. The estimate of the uplink channel signature is obtained as $$\hat{a}_{rx} = XS^*(SS^*)^{-1} \quad (9)$$

where matrix X=[x(0) x(1) . . . x(N−1)] and vector S=[s(0) s(1) . . . s(N31)]. Those skilled in the art may recognize this as the maximum likelihood estimate of the channel signature for modeling the received signals by $$x(k) = a_{rx} s(k) + v(k), k=0,1, \ldots, N-1 \quad (10)$$

where v(k) denotes a vector of additive noise at time k, the noise vector being a vector of statistically independent, identically distributed Gaussian random processes with a mean E{v(k)}=0 and covariance matrix E{v(k)v(k)*}=$\sigma_v^2$I, where I is the identity matrix. This part of the invention however does not depend on any modeling assumptions. In alternate embodiments, more or less sophisticated standard system identification techniques may be used in place of Eq. (9). The book by Lyung, L., *System Identification: Theory for the User,* Englewood-Cliffs, N.J.: Prentice-Hall, 1987 is a good source for many alternate system identification methods that may be adapted for use in the present invention. Note also that the solution of Eq. (9) and equivalent solutions are sometimes referred to herein as the maximum likelihood estimates, even when the received signal model and other conditions for the maximum likelihood are not met, and it is to be understood that the term "maximum likelihood estimate" means the solution that would be maximum likelihood when the appropriate linear signal model and noise conditions hold. For example, applying Eq. (11) or equivalent would fall under "maximum likelihood estimate" for any transmitted S and received X using any or no model with any kind of noise present.

Downlink Signature Estimation

In order to estimate the downlink channel, the base station 101 transmits one or more downlink calibration bursts towards subscriber unit 141. FIG. 10 describes the elements for determining the downlink signature $a_{tx}$. In the preferred embodiment, transmit signal processor 123 in base station 101 is programmed as a downlink calibration burst synthesizer 1005 to generate the downlink calibration burst (the first burst of step 725 or the second burst of step 727 depending on the number of bursts used in the embodiment of the method, and the step in that embodiment). Such a burst preferably is generated by recalling the burst from a memory in base station 101. The bursts are transmitted to subscriber unit 141 by using transmit signal processor 123 for the required spatial processing (shown in FIG. 10 as part of unit 1005) and then transmitting through the transmit RF electronics 125 and antenna array 105.

The bursts are received in the subscriber unit (e.g., unit 141) on antenna 911 via subscriber unit receive electronics 1009. Referring again to FIG. 12, the preferred embodiment subscriber unit includes RX DSP 1205 which for this implementation is programmed as a pre-processor 1011 to generate a sampled received signal 1012 denoted y(k) where k is used as a time index, and also programmed as a downlink channel identification processor 1013 which determines the downlink channel signature using the received signal 1012 and a stored version 1019 of the set of transmitted signals denoted by M-vector z(k). The stored version 1019 is stored in a buffer formed in memory 1207. The subscriber unit then transmits the result back to the base station.

In the particular embodiment, the signals are modulated using π/4 DQPSK and have a baud rate of 192 kbaud per sec. The received signal y(k) is four times oversampled. When used for two-tone calibration (see below), the transmitted calibration waveforms are appropriately modulated sine waves, and in the preferred embodiment, to preserve memory, only a single period of each sine wave is stored in memory 1207, that section of memory 1207 configured as a circular buffer. The data then is repeatedly read out as a sequence of periods.

A typical subscriber unit usually has at most a few antennas (one antenna 911 in the WLL system on which the invention preferably is implemented), which limits the information that is available for downlink signature estimation. Also, the hardware for a typical subscriber unit is simple because of size and cost constraints and therefore less capable of sophisticated, accurate processing than a typical base station's hardware. As a result, the received signal at the subscriber unit may have significant distortions including, without limitation, frequency and timing offset effects, and phase noise that may reduce the accuracy of the downlink channel estimate compared, for example to those of the uplink estimate. In the future, it is anticipated that more signal processing (or other computing) power will be available in average subscriber units to enable these distortions to be corrected in preprocessor 1011. However, our invention also works when less signal processing power is available.

In an improved embodiment, the base station uses specifically designed signal sequences that are robust with respect to effects that include, without limitation, frequency offset, timing offset, I/Q mismatch, and phase noise. This enables accurate results to be obtained using even simple inexpensive subscriber units with some, but limited, signal processing capability. For example, the downlink calibration burst may consist of pure tones. This enables RX DSP 1205 programmed as preprocessor 1011 in the subscriber unit to carry out frequency offset and timing alignment estimation with little computational effort. Alternatively, the downlink calibration burst can be synthesized from pseudo-random signal sequences or chirp (swept frequency) signal sequences which make it possible to characterize the propagation channel across a wider range of frequencies.

Let row vector $z(k)=[z_1(k)\ z_2(k)\ \ldots\ z_M(k)]$, $k=0, 1, \ldots, N-1$ denote the N samples (in baseband) of M modulated baseband signals $z_1(k), z_2(k), \ldots, z_M(k)$ that are transmitted from base station 101 from a calibration burst. Let $y(k)$ $k=0, 1, \ldots, N-1$ denote the N samples of the received signal (in baseband and after the preprocessing of 1011) at the subscriber unit. Define vector y and matrix Z as $$y = \begin{bmatrix} y(0) \\ y(1) \\ \vdots \\ y(N-1) \end{bmatrix} \quad Z = \begin{bmatrix} z_1(0) & z_2(0) & \cdots & z_M(0) \\ z_1(1) & z_2(1) & \cdots & z_M(1) \\ \vdots & & & \vdots \\ z_1(N-1) & z_2(N-1) & \cdots & z_M(N-1) \end{bmatrix},$$

respectively. The downlink signature estimate 1017 is preferably determined in identification processor 1013 according to $$\hat{a}_{tx} = (Z^*Z)^{-1}Z^*Y \tag{11}$$

Those skilled in the art may recognize that this is the maximum likelihood estimate of the downlink signature when the received signal samples 1012 conform to the model (in baseband) that $$y(k) = z(k)a_{tx} + n(k), k=0,1,\ldots,N-1 \tag{12}$$

where the $n(k)$, $k=0, \ldots, N-1$ denote some additive noise in the received signal, modeled as N statistically independent, identically distributed Gaussian random variables. Note that this invention does not depend on the received signal samples conforming to such a model. Note also that the solution of Eq. (11) and equivalent solutions are sometimes referred to herein as the maximum likelihood estimates, even when the received signal model and other conditions for the maximum likelihood are not met, and it is to be understood that the term "maximum likelihood estimate" means the solution that would be the maximum likelihood solution when the appropriate linear signal model and noise conditions hold. For example, applying Eq. (11) or equivalent would fall under the term "maximum likelihood estimate" for any transmitted Z and received Y using any or no model with any kind of noise present.

Denoting the noise samples as a vector $$n = \begin{bmatrix} n(0) \\ n(1) \\ \vdots \\ n(N-1) \end{bmatrix},$$

Eq. (12) can then be expressed as $$y = Za_{tx} + n \tag{13}$$

Note that the signature 1017 can be determined according to Eq. (11) only if Z has linearly independent columns. For this, each antenna element of the calibrated array (or subarray) transmits M (or fewer in the case of a subarray) substantially "linearly independent" signals from the M (or fewer) antenna elements during downlink calibration. M transmitted signals $z_i(k)$ are linearly independent if it is impossible to find constant complex valued parameters $c_1, c_2, \ldots, c_M$ so that $$\sum_{i=1}^{M} c_i z_i(k) = 0 \quad \text{for } k = 0, 2, \ldots, N-1.$$

In practice, this requirement can be fulfilled in various different ways. In one embodiment, the calibration burst can be divided into segments so that only one antenna element is active at any given time (orthogonality in the time domain). Alternatively, the antenna elements can transmit pure tones with different frequencies (orthogonality in the frequency domain). Linearly independent signals can also be synthesized from pseudo-random signal sequences or chirp signal sequences. Other techniques would be apparent to those of ordinary skill in the art.

Two-Tone Downlink Calibration

In the preferred embodiment, the antenna array is partitioned into 2-element subarrays with a common reference element, as shown in FIG. 8, and each subarray is calibrated independently. In one embodiment, during calibration each antenna element of a particular subarray transmits a complex valued sine wave at a different frequency. Denote by $\omega_1$ and $\omega_2$ (in radians per second) the frequencies of the first calibration signal through the first antenna element of a particular subarray and the second calibration signal through the second antenna element of a particular subarray, respectively. In this case, the value of M is 2 and the downlink channel estimate according to Eq. (11) is $$\begin{bmatrix} \hat{a}_1 \\ \hat{a}_2 \end{bmatrix} = \begin{bmatrix} N & \frac{e^{j\Delta\omega NT}-1}{e^{j\Delta\omega T}-1} \\ \frac{e^{-j\Delta\omega NT}-1}{e^{-j\Delta\omega T}-1} & N \end{bmatrix}^{-1} \begin{bmatrix} \sum_{k=0}^{N-1} y(k)e^{-j\omega_1 kT} \\ \sum_{k=0}^{N-1} y(k)e^{-j\omega_2 kT} \end{bmatrix} \tag{14}$$

where T denotes the sampling period for the signals and $\Delta\omega = \omega_2 - \omega_1$ denotes the frequency separation between the tones. If N is chosen so that the observation interval NT is an integer multiple of $2\pi/\Delta\omega$, then $e^{j\Delta\omega NT}=1$, and we obtain the simple formulas $$\hat{a}_1 = \frac{1}{N}\sum_{k=0}^{N-1} y(k)e^{-j\omega_1 kT}, \tag{15a}$$

$$\hat{a}_2 = \frac{1}{N}\sum_{k=0}^{N-1} y(k)e^{-j\omega_2 kT}. \tag{15b}$$

One will recognize these as the discrete Fourier transform (DFT or its rapid implementation, the FFT) of the received signal at $\omega_1$ and $\omega_2$, respectively. One also will recognize these as proportional to the cross-correlations of the received subscriber unit signal y with the two calibration bursts, respectively. Clearly, in implementation, the 1/N factors are not included in determining the signatures.

The relative downlink signature for one of the antenna elements, say the second antenna element, with the first antenna element as the reference, is computed as the second cross correlation divided by the first cross correlation.

In the preferred embodiment implementation, RX DSP 1205 is programmed as downlink channel identification processor 1013. Received signal samples y(k) are four times oversampled 192 kbaud per sec. signals. That is, there are 784 ksamples per second. The two frequencies used are 24 kHz (divided by $2\pi$ for kradians/sec.) and −72 kHz (recall that the calibration signals are complex valued). In general, the larger the frequency difference $\Delta\omega=\omega_2-\omega_1$, the better the performance. In the preferred implementation, signals are synthesized by providing particular bit patterns to the $\pi/4$ DQPSK modulator (the standard for PHS). This enables the tones to be easily synthesized. However, the $\pi/4$ DQPSK modulation and the particular baud rate means that effectively only signals with frequencies of +72 kHz, +24 kHz, −24 kHz and −72 kHz may be synthesized. While the greatest separation would be obtained with the tone pair being at +72 kHz and −72 kHz, the 72 kHz signals appear less like pure tones than the 24 kHz signals, so the two tones used in the preferred embodiment are +24 kHz and −72 kHz. That this performs better than using +24 kHz and −24 kHz tones is discussed in the "Performance" section herein below. The DSP program implementing channel identification processor 1013 may be summarized as follows:

Two-Tone Downlink Procedure

INPUTS: subscriber received sequence y(0), y(1), . . . , y(N−1).

OUTPUT: The estimated downlink channel in the form $$\begin{bmatrix} 1 \\ C \end{bmatrix}.$$

1. Cross-correlate the received sequence with the first calibration sequence (tone at frequency $\omega_1$):

$$A = \sum_{k=0}^{N-1} y(k)e^{-j\omega_1 kT}.$$

2. Cross-correlate the received sequence with the second calibration sequence (tone at frequency $\omega_2$):

$$B = \sum_{k=0}^{N-1} y(k)e^{-j\omega_2 kT}.$$

3. Compute the desired quantity C=B/A.

Note that alternate implementations may use different methods for synthesizing the tone signals that do not include the limitations of what tones are available, such methods possibly requiring more complex implementation, or may use different orthogonal signals.

The method using tone calibration bursts is robust with respect to phase noise and frequency offset for frequency offsets and phase noises that are small compared to the frequency difference $\Delta\omega$.

When large timing offsets are present, an improved embodiment of the two-tone method allows such a timing offset to be determined and the quantities corrected for the timing offset. Let $\tau$ denote the constant time by which the transmitted signal is delayed. In this improved embodiment, the calibration bursts are broken up into two time segments, with the break point the same for the two bursts. During the first time segment, a sum of the first and second sine waves is transmitted from the same antenna element, say the first antenna element. Let there be $N_1$ samples during the first time segment and denote the received signal at the subscriber unit by $y_1(k)$, k=0, . . . , $N_1-1$. Assuming that the first segment observation interval $N_1T$ is an integer multiple of $2\pi/\Delta\omega$, an estimate for the timing offset is determined from the ratio of the cross correlation of the subscriber unit received signal with the second correlation burst to the cross correlation of the subscriber unit received signal with the first correlation burst:

$$e^{j\Delta\omega\tau} = \frac{\sum_{k=0}^{N_1-1} y_1(k)e^{-j\omega_2 kT}}{\sum_{k=0}^{N_1-1} y_1(k)e^{-j\omega_1 kT}}. \tag{16}$$

On the second segment of the calibration bursts, the two sine waves are transmitted via two different antennas as in the previously described embodiment of the two-tone method. Let there be $N_2$ samples during the second time segment and denote the received signal at the subscriber unit by $y_2(k)$, k=0, . . . , $N_2-1$. If $N_2$ is chosen so that the observation interval $N_2T$ is an integer multiple of $2\pi/\Delta\omega$, then $$\frac{\sum_{k=0}^{N_2-1} y_2(k)e^{-j\omega_2 kT}}{\sum_{k=0}^{N_2-1} y_2(k)e^{-j\omega_1 kT}} = \frac{\hat{a}_2}{\hat{a}_1} e^{-j\Delta\omega\tau} \tag{17}$$

Combining Eqs. (16) and (17) leads to the desired ratio of the two downlink signature estimates. For simplicity, the two segments are made of equal length, $N_1=N_2$. As in the first two-tone embodiment, the two frequencies used are 24 kHz and −72 kHz (recall that the calibration signals are complex valued). The DSP program for RX DSP 1205 implementing channel identification processor 1013 according to the second implementation that includes correcting for the timing offset may be summarized as follows.

Improved Two-Tone Downlink Procedure

INPUTS: received sequence y(0), y(1), . . . , y(N), . . . , y(2N−1).

OUTPUT: The estimated downlink channel in the form $$\begin{bmatrix} 1 \\ C \end{bmatrix}.$$

1. Cross-correlate the first half of the received sequence with the first half of calibration sequence #1:

$$A1 = \sum_{k=0}^{N-1} y(k)e^{-j\omega_1 kT}.$$

2. Cross-correlate the first half of the received sequence with the first half of calibration sequence #2:

$$B1 = \sum_{k=0}^{N-1} y(k)e^{-j\omega_2 kT}.$$

3. Compute C1=B=A1.
4. Cross-correlate the second half of the received sequence with the second half of calibration sequence #1:

$$A2 = \sum_{k=N}^{2N-1} y(k)e^{-j\omega_1 kT}.$$

5. Cross-correlate the second half of the received sequence with the second half of calibration sequence #2:

$$B2 = \sum_{k=N}^{2N-1} y(k)e^{-j\omega_2 kT}.$$

6. Compute C2=B2/A2.
7. Compute the desired quantity C=C2/C1.

It would be clear to those of ordinary skill in the art that various modifications may be made to the methods, including without limitation, using segments of unequal length, using two sets of two tone signals (separated by a known amount), and transmitting different combinations. Different formulas also may be used to determine the calibration factors.

It is advantageous to use any two constant modulus signals whose dot product is a pure tone. Alternatively, one might, for example, use a tone for the first segment and a chirp signal sequence for the second.

Figure 11:
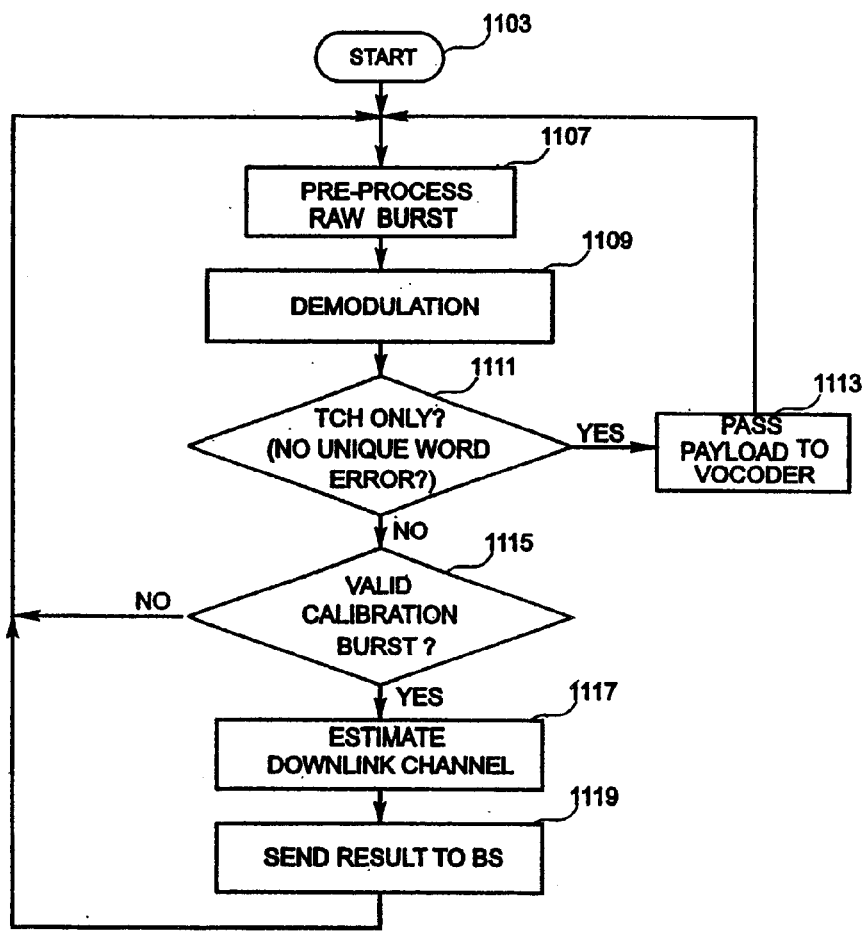
FIG. 11 shows a flowchart of one embodiment of a method for carrying out downlink signature determination with calibration bursts interspersed with normal TCH bursts.

One embodiment of this improved downlink procedure is summed up with reference to FIG. 11. A user terminal receives 1500 the first segment of the calibration burst. A first measurement—value C1 at item 3 in the chart above— related to the downlink spatial signature of the user terminal is then calculated 1502. The user terminal also receives 1504 the second segment of the calibration burst. A second measurement—value C2 at item 6 in the chart above— related to the downlink spatial signature of the user terminal is then calculated 1506. Then, a partial spatial signature— the part of the signature describing the antenna element being calibrated, shown as C at item 7 in the chart above—is determined 1508 from the two intermediate measurements.

One also may generalize the method to deal with more than two antennas at a time. The following alternative method works for any number of M antennas. In the first segment (say the first half) of the segment, the sum of M different single tone signals, each of the M tones being distinct, is transmitted from the first (say the reference) antenna element, while no signal is transmitted from the other antenna elements. In the second segment, a different one of the M single tone signals is transmitted from the M antenna elements. The method then proceeds as follows to estimate the M-antenna element array (or subarray). The notation used is that the first half correlations are denoted by $A_i$ with the subscript i denoting which tone the received signal was correlated with, while the second half correlations are denoted by $B_i$ with the subscript i denoting which tone the received signal was correlated with. The M pure tone signals have frequencies denoted by $\omega_1, \omega_2, \ldots \omega_M$, respectively.

$$\begin{bmatrix} 1 \\ C_2 \\ \vdots \\ C_M \end{bmatrix}.$$

The above generalization for determining the signature for M elements simultaneously can be modified to avoid transmitting the sum of all the M tones on one antenna element in the first segment. In general, one can assume that the timing offset is the same for transmissions from all the antenna elements of a base station. In the system in which the embodiments described herein is implemented, all the ADCs and all the downconversions and upconversions are synchronized. In such a case, for example, only the sum of the tone transmitted from the reference antenna element and one other antenna tone (e.g., the second) are transmitted from the first element in the first segment. How to modify the above generalization in this and many other ways would be clear to one of ordinary skill in the art.

Note that while the above discussion mentions canceling out timing offsets, the dividing of the factors also cancels out any phase offsets.

Timing Offset Determination

The above discussion also suggests how sending multiple signals, for example, pure tone signals, can be used to determine the timing offset in the subscriber unit with very little computation.

To determine timing offset, one carries out steps 1, 2 and 3 of the "Improved Two-Tone Downlink Method" above. In step 3, the quantity C1 is essentially $\exp-j(\omega_2-\omega_1)\tau$. Thus, taking logarithms and diving by $\Delta\omega=(\omega_2-\omega_1)$ gives an estimate of the timing offset $\tau$.

In an improved timing offset method, one carries steps 1 and 2 of the "Improved M-Tone Downlink Method" above. In step 2, the quantities $1, A_2/A_1, \ldots, A_M/A_1$, respectively, give the M quantities 1, $\exp-j(\omega_2-\omega_1)\tau, \ldots, \exp-j(\omega_M-\omega_1)$ $\tau$, respectively. Taking logarithms of the last M-1 quantities and dividing the first of these by $(\omega_2-\omega_1)$, the second by $(\omega_3-\omega_1), \ldots$, and the last by $(\omega_M-\omega_1)$, respectively, gives M-1 estimates of the timing offset $\tau$. These may be averaged to give a final estimate of the timing offset Calibration During Standard Traffic Channel Calls In yet another alternate embodiment, instead of using dedicated calibration calls, it is possible to embed the calibration procedure into standard telephone calls in both directions which are used for normal traffic functions. Normal traffic functions depend on the air interface, and may include demodulation, timing and frequency tracking, and various control functions such as power control and handoff. For example, the uplink channel signature can be estimated from standard uplink traffic channel (TCH) bursts by using a decision directed technique as described above. The downlink channel estimation method described above is modified as follows:

On the downlink, the base station transmits a mixture of TCH bursts and calibration bursts towards the subscriber unit in a random fashion. That is, the calibration bursts are interspersed with the TCH bursts. Because calibration bursts may cause audible errors to occur, it is preferable to send such calibration bursts infrequently and during silent periods. A typical silent period is longer than a burst, so in an improved embodiment, calibration bursts are sent (instead of TCH bursts) only after a number of idle bursts are sent by the base station.

An illustrative embodiment of processing by the subscriber unit which includes estimating the downlink channel signature is shown in FIG. 11. In step 1105 the subscriber unit acquires the raw burst and first preprocesses the burst in the receive signal processor programmed as preprocessor 1011. This received preprocessed signal is stored. The preprocessed signal next is demodulated in step 1109 as would be a standard TCH burst. In step 1111, it is determined whether or not the demodulated bits are for a standard TCH burst. As in most standard protocols, the PHS protocol used in the system of the illustrative embodiment includes some method to determine when a sequence is correctly received, for example, the presence of a particular pre-defined bit-sequence. In the PHS standard, there is such a 32-bit "Unique Word" sequence, which is prearranged and known to every subscriber unit. Correct reception is determined in step 1111 by detecting the presence of the Unique Word. Other protocols use other techniques, and alternate ways of determining correct reception of a standard TCH burst in whatever protocol would be clear to those of ordinary skill in the art using the specification of the protocol. If the burst is determined to be a standard TCH burst, then the bit sequence is forwarded in step 1113 to vocoder DSP 1209. If, on the other hand, the bit sequence is not recognized as a standard TCH burst, then the subscriber unit in step 1115 determines whether the received burst is a calibration burst. In the two-tone methods described herein above, this step 1115 is performed preferably by carrying out the first correlation step of the calibration method. If the correlation is high, then there is a high level of confidence that this is a calibration burst. If the result of step 1115 is that yes, this is a calibration burst, then the downlink signature estimation method is continued in step 1117 and the resulting downlink signature is sent to the base station in step 1119.

Calibration Using SYNCH Bursts

In yet another alternate embodiment, instead of using dedicated calibration calls, it is possible to embed the calibration bursts into SYNCH bursts, the calibration bursts preferably being the two-segment multi-tone bursts (or two-segment two-tone busts for pairwise calibration).

Performance

Figure 13:
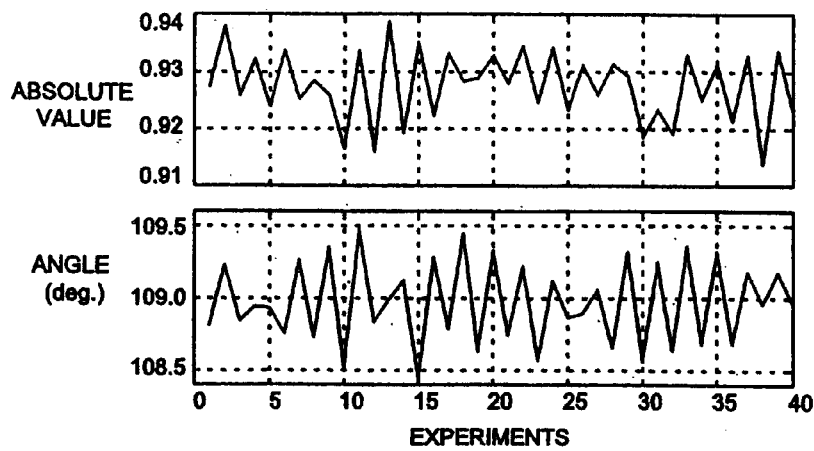
FIG. 13 shows the results of testing a two antenna element implementation of the method for downlink signature estimation.

The accuracy of the downlink channel estimate for the two-tone method (improved implementation including timing alignment correction) was measured by performing experiments using the PHS base station and a subscriber unit from the WLL system used in the preferred embodiment. In the first experiment, two antennas of the PHS base station were used with two different sets of transmit electronics. Forty sets of calibration bursts were sent to the subscriber unit, and the subscriber unit was programmed to save the received signal. The saved received signal was then used to calculate the relative downlink signature. The calculation was carried out offline using the MATLAB environment (The Mathworks, Inc., Natick, Mass.). The results are shown in FIG. 13. As can be seen, for the carrier frequency of the experiment, the two transmit electronics/antenna elements had different amplitude gains and produced the relative phase of about 109 degrees. The two tones used were +24 kHz and −72 kHz.

Figure 14:
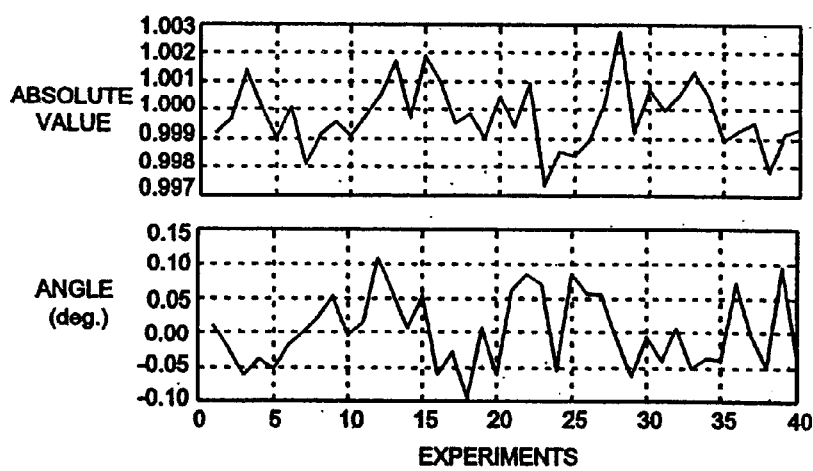
FIG. 14 shows the results of testing an implementation of the method for downlink signature estimation using a single transmitter and antenna element.
Figure 15:
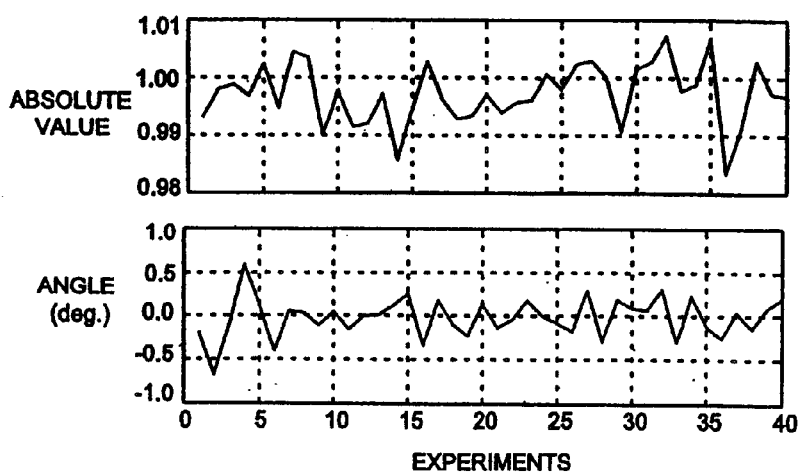
FIG. 15 shows the results of testing an implementation of the method for downlink signature estimation using a single transmitter and antenna element, but with a different set of frequencies than used to obtain the results of FIG. 14.
Figure 16:
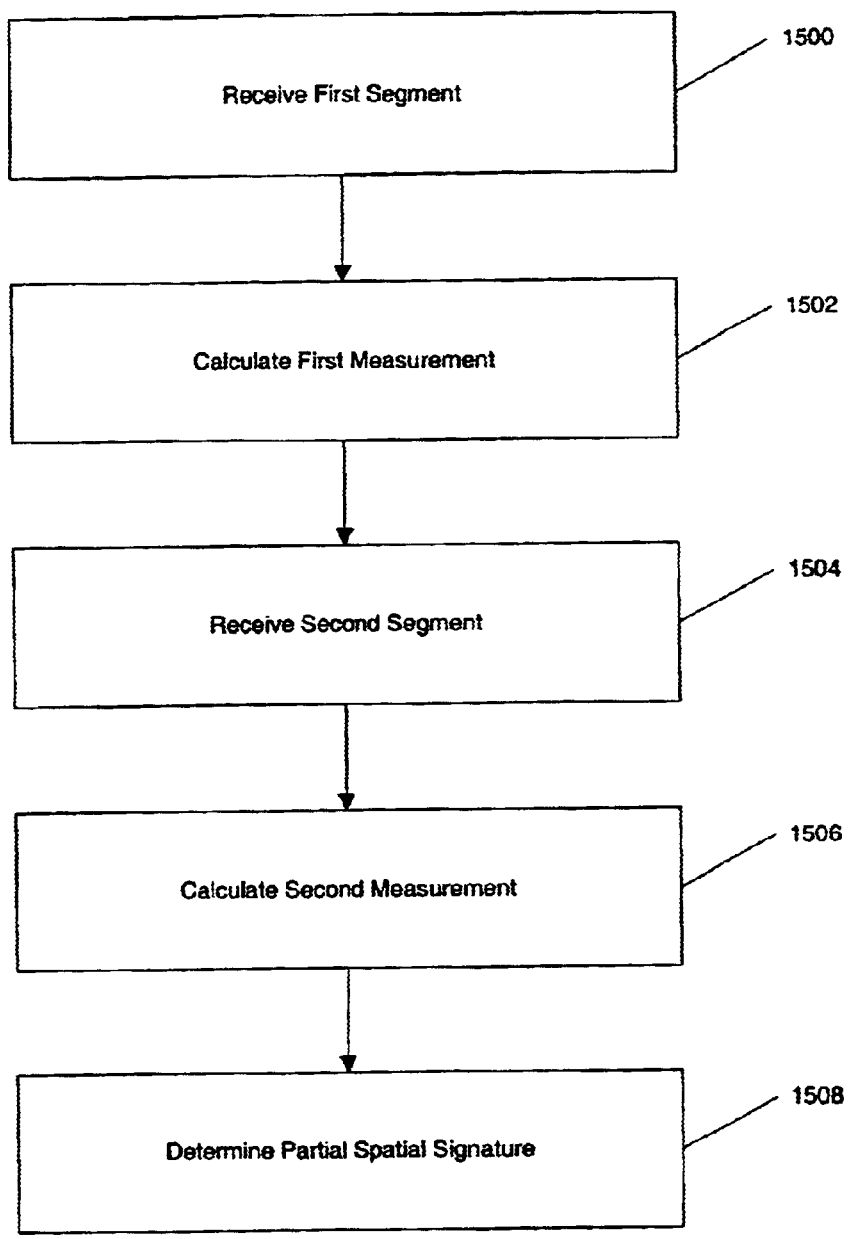
FIG. 16 shows a flowchart of one embodiment of an improved downlink procedure.

A second experiment was carried out, this time by using the same transmit electronics and the same antenna. That is, the two calibration signals (the two tones) were transmitted from the same electronics and antenna element. FIG. 14 shows the results when the two tones used were +24 kHz and −72 kHz. As can be seen, the phase angle was close to 0.0, and the magnitude close to 1.0, as would be expected. This same experiment was repeated with the two tones being at +24 kHz and −24 kHz. The results are shown in FIG. 15. The error and variance when using these two tones were larger that when using the frequencies used for FIG. 14.

Using Several Subscriber Units

In another aspect of the invention, the calibration factor may be obtained using more than one subscriber unit and determined as a function of signatures obtained from these subscriber units. These may even be all subscriber units. The function may be, for example, a principal component, an average, or a centroid. In the preferred embodiment of the combining step, the principal component method is used. Signatures $a_1, \ldots, a_{Ns}$ gathered from subscribers $1, \ldots$, Ns, respectively, are combined by forming a matrix $A=[a_1 \ldots a_{Ns}]$ and computing the principal component (the eigenvector corresponding the eigenvalue of largest magnitude) of $A^H A$ or, equivalently, by finding the left singular vector corresponding to the largest singular value of A. In an improved embodiment, each subscriber unit also obtains a signal quality estimate, and these estimates are sent to the base station. Any subscriber unit implemented signal quality determining method may be used, and the method (and apparatus) for determining signal quality used in the preferred embodiment is the kurtosis based method disclosed in above referenced U.S. patent application Ser. No. 09/020, 049 and also described herein above. Note also that signal quality related measures may already be available at the base station for power control purposes. When signal quality estimates are available, a weighted average calibration factor is obtained, the weighting for a calibration factor using a subscriber unit according to the received signal quality for that subscriber unit. For example using the principal component method, the signature estimate is the principal component of the weighted signature matrix $A=[\beta_1 a_1 \ldots \beta_{Ns} a_{Ns}]$, where $\beta_1, \ldots, \beta_{Ns}$ are the weighting factors for respective subscriber units $1, \ldots$, Ns.

In yet another aspect, the calibration factor may again be obtained as a function of calibration factors obtained from several (even all) subscriber units. However, the function takes into account the relative "quality" of each element of the signature estimate from each of these subscriber units. This is applicable to the case when for a subscriber unit, one or more of the base station antenna elements are "weak" compared to the other elements. In such a case, some of the signature estimate elements and the corresponding calibration factor elements are discarded. For example, one might discard signature elements that have a smaller (normalized) magnitude than some magnitude threshold. Alternatively, one might use the signature estimates to compare predicted received signals to actual received signals, and thus determine residual error (for example, error squared averaged over a burst) for each element and discard signature elements that produce a large residual error. One then can combine several such "incomplete" calibration factor estimates that include at least one estimate of every one of the 5 calibration factor elements. As an example, suppose there are four antenna elements in an array (or subarray), and at three subscriber units denoted SU1, SU2, and SU3, respectively, the first and second elements, second and third elements, and third and fourth elements, respectively, are deemed sufficiently accurate. Denoting the jth calibration factor element using the ith subscriber unit by $C_{ij}$, the four elements of the complete calibration factor estimate are determined as $C_{11}$, $C_{12}$, $C_{23}(C_{12}/C_{22})$, and $C_{34}$ $(C_{12}/C_{22})$ $(C_{23}/C_{33})$, respectively. This can be generalized to any set of complete or incomplete SU determinations as follows: Let $C_{ij}$, be the jth calibration factor element determined from the ith subscriber unit and let $Q_{ij}$ be the estimate quality associated with the measurement of $C_{ij}$ where i=1, ..., Ns and j=1, ..., M. With the above-mentioned method of determining signature reliability, $Q_{ij}$ has value 0 if the component is deemed unreliable or value 1 if it is deemed reliable. Other methods of mathematically indicating reliability also are possible, as will be clear to those of ordinary skill in the art. The complete calibration vector $D=[D_1 D_2 \ldots D_M]$ is determined by performing a joint minimization over D and the complex-valued parameters $B_1, \ldots, B_{N_s}$. That is, defining $B=[B_1 \ldots B_{N_s}]$, D is determined by carrying out the operation $$\min_D \min_B \sum_{ij} Q_{ij} |D_j - C_{ij} B_i|^2.$$

This minimization can be carried out using standard methods, for example by performing a grid search over D to approximately locate the global minimum, and then performing a gradient descent to refine the estimate. Alternative methods would be clear to those of ordinary skill in the art.

Other Aspects

As will be understood by those of ordinary skill in the art, many changes in the methods and apparatuses as described above may be made without departing from the spirit and scope of the invention. Variations include, without limitation:

The method can be modified for estimating uplink signatures or downlink signatures rather than only for determining a calibration factor to use for estimating a downlink weight vector from an uplink weight vector.

Each uplink signature or downlink signature may be determined as a vector of transfer functions. The methods described herein would be modified to include standard transfer function system identification techniques.

The uplink or downlink channel signatures may be obtained using formulas other than derived from Eq. (9) or Eq. (11), based on different models for the channels and different estimation techniques.

The uplink or downlink channel signatures may be described in other than baseband, as would be applicable to the case of the uplink and downlink weights being applied at a base station to signals in other than baseband.

The methods can be adapted for different types of communication systems, including, without limitation, systems with mobile subscriber units, or systems using different protocols, or both. The methods also can be adapted to non-digital modulated systems, such as the common AMPS FDMA system. The method also can be adapted to non TDMA digital systems. In such cases, the uplink and downlink frequencies are in general different, so that separate uplink and downlink signatures need to be obtained for each subscriber unit. Note that we can then determine downlink weight vectors knowing all the downlink signatures for the subscriber units.

Different pre-defined calibration signals may be used.

Different subarray configurations (of more than two antenna elements) may be used, or all the antenna elements in the array calibrated simultaneously.

More or less of the downlink processing can occur in the subscriber units, depending on how much computation and storage power is available in the subscriber unit and the base station.

Several aspects of the invention described herein were described implemented as programs run on one or more DSP devices. Given sufficient economic incentive, DSP functionality, including DSP programs, may be incorporated into special purpose hardware, for example as part of an application specific integrated circuit (ASIC) or as part of a very large scale integrated circuit (VLSI). DSP functionality may also be met by other processors, for example a general purpose microprocessor. In addition, a DSP device running a program may be converted into a special purpose piece of hardware. Thus, the terms digital signal processor, DSP, and DSP device as used herein include these equivalent alternatives.

As will be understood by those skilled in the art, the skilled practitioner may make many changes in the methods and apparatuses as described above without departing from the spirit and scope of the invention. For example, the communication station in which the method is implemented may use one of many protocols. In addition, several architectures of these stations and subscriber units are possible. The invention may be applied in a system comprising any antenna-array-equipped transceiver and another transceiver communicating with the array-equipped transceiver. Many more variations are possible. The true spirit and scope of the invention should be, limited only as set forth in the claims that follow.

What is claimed is:

1. A method comprising:
   receiving a first segment of a waveform, the first segment resulting from a radio transmitting a combined signal from a first antenna element, the combined signal comprising the sum of a first signal and a second signal;
   calculating a first spatial signature related measurement using the received first segment, the first signal and the second signal;
   receiving a second segment of the waveform, the second segment resulting from the radio transmitting the first signal from the first antenna element, and the radio simultaneously transmitting the second signal from a second antenna element;
   calculating a second spatial signature related measurement using the second received segment, the first signal, and the second signal; and
   determining a partial spatial signature using the first spatial signature related measurement and the second spatial signature related measurement.

2. The method of claim 1, wherein the first signal comprises a first tone, and the second signal comprises a second tone.

3. The method of claim 2, wherein the first tone and the second tone conform to a phase shift-keyed air interface.

4. The method of claim 2, wherein the first tone is about 24 kHz from a carrier frequency, and the second tone is about 72 kHz from the carrier frequency.

5. The method of claim 1, wherein calculating the first spatial signature related measurement using the first segment, the first signal, and the second signal comprises:
determining a first correlation by cross-correlating the first segment with a copy of the first signal;
determining a second correlation by cross-correlating the first segment with a copy of the second signal; and
determining the first spatial signature related measurement by dividing the first cross-correlation by the second cross-correlation.

6. The method of claim 1, wherein calculating the second spatial signature related measurement using the second segment, the first signal, and the second signal comprises:
determining a first correlation by cross-correlating the second segment with a copy of the first signal;
determining a second correlation by cross-correlating the second segment with a copy of the second signal; and
determining the second spatial signature related measurement by dividing the first cross-correlation by the second cross-correlation.

7. The method of claim 1, wherein determining the partial spatial signature using the first spatial signature related measurement and the second spatial signature related measurement comprises multiplying the first spatial signature related measurement with the second spatial signature related measurement.

8. The method of claim 1, wherein the first and second spatial signature related measurement both contain a timing factor, and wherein determining a partial spatial signature using the first spatial signature related measurement and the second spatial signature related measurement comprises combining the first spatial signature related measurement with the second spatial signature related measurement so as to cancel out the timing factor.

9. The method of claim 1, wherein the first signal is transmitted from a third antenna element of the radio.

10. The method of claim 1, wherein the partial spatial signature comprises a complete spatial signature related to reception of signals from the radio at a second radio.

11. The method of claim 10, wherein the radio comprises a base station in a wireless radio communications system, and the second radio comprises a remote terminal in the wireless radio communications system.

12. A method comprising:
receiving a first waveform from a first antenna element of a first radio at a second radio;
calculating a first spatial signature related measurement using the received first waveform;
receiving a second waveform from a plurality of antenna elements of the first radio at the second radio,
calculating a second spatial signature related measurement using the received second waveform;
determining a partial spatial signature using the first spatial signature related measurement and the second spatial signature related measurement.

13. The method of claim 12, wherein the first antenna element is one of the plurality of antenna elements.

14. The method of claim 12, wherein the first waveform results from a first radio transmitting a combined signal from the first antenna element, the combined signal comprising a combination of a plurality of signals.

15. The method of claim 14, wherein the second waveform results from the first radio transmitting the plurality of signals from the plurality of antenna elements, each signal corresponding with one antenna element.

16. The method of claim 14, wherein the combination of the plurality of signals comprises a sum of the plurality of signals.

17. The method of claim 12, wherein the first spatial signature related measurement comprises a timing measurement, and determining the partial spatial signature comprises correcting a timing error of the second spatial signature related measurement using the timing measurement.

18. The method of claim 12, wherein the first waveform is robust with respect to timing offset.

19. The method of claim 12, wherein the partial spatial signature comprises a complete spatial signature, the complete spatial signature being related to reception of signals from the first radio at the second radio.

20. A machine-readable medium having stored thereon data representing instructions that, when executed by a processor, cause the processor to perform operations comprising:
receiving a first waveform from a first antenna element of a first radio at a second radio;
calculating a first spatial signature related measurement using the received first waveform;
receiving a second waveform from a plurality of antenna elements of the first radio at the second radio,
calculating a second spatial signature related measurement using the received second waveform;
determining a partial spatial signature using the first spatial signature related measurement and the second spatial signature related measurement.

21. The machine-readable medium of claim 20, wherein the first antenna element is one of the plurality of antenna elements.

22. The machine-readable medium of claim 20, wherein the first waveform results from a first radio transmitting a combined signal from the first antenna element, the combined signal comprising a combination of a plurality of signals.

23. The machine-readable medium of claim 22, wherein the second waveform results from the first radio transmitting the plurality of signals from the plurality of antenna elements, each signal corresponding with one antenna element.

24. The machine-readable medium of claim 22, wherein the combination of the plurality of signals comprises a sum of the plurality of signals.

25. The machine-readable medium of claim 20, wherein the first spatial signature related measurement comprises a timing measurement, and determining the partial spatial signature comprises correcting a timing error of the second spatial signature related measurement using the timing measurement.

26. The machine-readable medium of claim 20, wherein the first waveform is robust with respect to timing offset.

27. The method of machine-readable medium 20, wherein the partial spatial signature comprises a complete spatial signature, the complete spatial signature being related to reception of signals from the first radio at the second radio.

28. A communications device comprising:
a receiver for:
receiving a first waveform from a first antenna element of a first radio; and receiving a second waveform from a plurality of antenna elements of the first radio; and a processor coupled to the receiver, the processor for:

calculating a first spatial signature related measurement using the received first waveform;

calculating a second spatial signature related measurement using the received second waveform; and determining a partial spatial signature using the first spatial signature related measurement and the second spatial signature related measurement.

29. The communications device of claim 28, wherein the first antenna element is one of the plurality of antenna elements.

30. The communications device of claim 28, wherein the first waveform results from a first radio transmitting a combined signal from the first antenna element, the combined signal comprising a combination of a plurality of signals.

31. The communications device of claim 30, wherein the second waveform results from the first radio transmitting the plurality of signals from the plurality of antenna elements, each signal corresponding with one antenna element.

32. The communications device of claim 30, wherein the combination of the plurality of signals comprises a sum of the plurality of signals.

33. The communications device of claim 28, wherein the first spatial signature related measurement comprises a timing measurement, and determining the partial spatial signature comprises correcting a timing error of the second spatial signature related measurement using the timing measurement.

34. The communications device of claim 28, wherein the first waveform is robust with respect to timing offset.

35. The communications device of claim 28, wherein the partial spatial signature comprises a complete spatial signature, the complete spatial signature being related to reception of signals from the first radio at the second radio.

* * * * *